United States Patent
Judge et al.

(10) Patent No.: US 8,621,638 B2
(45) Date of Patent: Dec. 31, 2013

(54) SYSTEMS AND METHODS FOR CLASSIFICATION OF MESSAGING ENTITIES

(75) Inventors: Paul Judge, Atlanta, GA (US); Matt Moyer, Atlanta, GA (US); Guru Rajan, Duluth, GA (US); Dmitri Alperovitch, Atlanta, GA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/108,529

(22) Filed: May 16, 2011
(Under 37 CFR 1.47)

(65) Prior Publication Data

US 2012/0110672 A1 May 3, 2012

Related U.S. Application Data

(60) Provisional application No. 61/334,819, filed on May 14, 2010.

(51) Int. Cl.
*G06F 21/00* (2013.01)

(52) U.S. Cl.
USPC .......... 726/25; 726/22; 726/23; 726/24; 713/187; 713/188; 713/192; 713/193

(58) Field of Classification Search
USPC .......... 726/22–25; 713/187–188, 192–193
See application file for complete search history.

(56) References Cited

U.S. PATENT DOCUMENTS

| | | | |
|---|---|---|---|
| 4,289,930 A | 9/1981 | Connolly et al. | |
| 4,384,325 A | 5/1983 | Slechta et al. | |
| 4,386,416 A | 5/1983 | Giltner et al. | |
| 4,532,588 A | 7/1985 | Foster | |
| 4,713,780 A | 12/1987 | Schultz et al. | |
| 4,754,428 A | 6/1988 | Schultz et al. | |
| 4,837,798 A | 6/1989 | Cohen et al. | |
| 4,853,961 A | 8/1989 | Pastor | |
| 4,864,573 A | 9/1989 | Horsten | |
| 4,951,196 A | 8/1990 | Jackson | |
| 4,975,950 A | 12/1990 | Lentz | |
| 4,979,210 A | 12/1990 | Nagata et al. | |
| 5,008,814 A | 4/1991 | Mathur | |
| 5,020,059 A | 5/1991 | Gorin et al. | |
| 5,051,886 A | 9/1991 | Kawaguchi et al. | |
| 5,054,096 A | 10/1991 | Beizer | |
| 5,105,184 A | 4/1992 | Pirani et al. | |
| 5,119,465 A | 6/1992 | Jack et al. | |
| 5,136,690 A | 8/1992 | Becker et al. | |

(Continued)

FOREIGN PATENT DOCUMENTS

| AU | 2003230606 | 10/2003 |
|---|---|---|
| AU | 2005304883 | 5/2006 |

(Continued)

*Primary Examiner* — David Pearson
*Assistant Examiner* — Josnel Jeudy
(74) *Attorney, Agent, or Firm* — Patent Capital Group

(57) ABSTRACT

Methods and systems for operation upon one or more data processors for biasing a reputation score. A communication having data that identifies a plurality of biasing characteristics related to a messaging entity associated with the communication is received. The identified plurality of biasing characteristics related to the messaging entity associated with the communication based upon a plurality of criteria are analyzed, and a reputation score associated with the messaging entity is biased based upon the analysis of the identified plurality of biasing characteristics related to the messaging entity associated with the communication.

21 Claims, 8 Drawing Sheets

(56) References Cited

U.S. PATENT DOCUMENTS

| | | |
|---|---|---|
| 5,144,557 A | 9/1992 | Wang |
| 5,144,659 A | 9/1992 | Jones |
| 5,144,660 A | 9/1992 | Rose |
| 5,167,011 A | 11/1992 | Priest |
| 5,210,824 A | 5/1993 | Putz et al. |
| 5,210,825 A | 5/1993 | Kavaler |
| 5,235,642 A | 8/1993 | Wobber et al. |
| 5,239,466 A | 8/1993 | Morgan et al. |
| 5,247,661 A | 9/1993 | Hager et al. |
| 5,276,869 A | 1/1994 | Forrest et al. |
| 5,278,901 A | 1/1994 | Shieh et al. |
| 5,283,887 A | 2/1994 | Zachery |
| 5,293,250 A | 3/1994 | Okumura et al. |
| 5,313,521 A | 5/1994 | Torii et al. |
| 5,319,776 A | 6/1994 | Hile et al. |
| 5,355,472 A | 10/1994 | Lewis |
| 5,367,621 A | 11/1994 | Cohen et al. |
| 5,377,354 A | 12/1994 | Scannell et al. |
| 5,379,340 A | 1/1995 | Overend et al. |
| 5,379,374 A | 1/1995 | Ishizaki et al. |
| 5,384,848 A | 1/1995 | Kikuchi |
| 5,404,231 A | 4/1995 | Bloomfield |
| 5,406,557 A | 4/1995 | Baudoin |
| 5,414,833 A | 5/1995 | Hershey et al. |
| 5,416,842 A | 5/1995 | Aziz |
| 5,418,908 A | 5/1995 | Keller et al. |
| 5,424,724 A | 6/1995 | Williams et al. |
| 5,479,411 A | 12/1995 | Klein |
| 5,481,312 A | 1/1996 | Cash et al. |
| 5,483,466 A | 1/1996 | Kawahara et al. |
| 5,485,409 A | 1/1996 | Gupta et al. |
| 5,495,610 A | 2/1996 | Shing et al. |
| 5,509,074 A | 4/1996 | Choudhury et al. |
| 5,511,122 A | 4/1996 | Atkinson |
| 5,513,126 A | 4/1996 | Harkins et al. |
| 5,513,323 A | 4/1996 | Williams et al. |
| 5,530,852 A | 6/1996 | Meske, Jr. et al. |
| 5,535,276 A | 7/1996 | Ganesan |
| 5,541,993 A | 7/1996 | Fan et al. |
| 5,544,320 A | 8/1996 | Konrad |
| 5,550,984 A | 8/1996 | Gelb |
| 5,550,994 A | 8/1996 | Tashiro et al. |
| 5,557,742 A | 9/1996 | Smaha et al. |
| 5,572,643 A | 11/1996 | Judson |
| 5,577,209 A | 11/1996 | Boyle et al. |
| 5,586,254 A | 12/1996 | Kondo et al. |
| 5,602,918 A | 2/1997 | Chen et al. |
| 5,606,668 A | 2/1997 | Shwed |
| 5,608,819 A | 3/1997 | Ikeuchi |
| 5,608,874 A | 3/1997 | Ogawa et al. |
| 5,619,648 A | 4/1997 | Canale et al. |
| 5,621,889 A | 4/1997 | Lermuzeaux et al. |
| 5,632,011 A | 5/1997 | Landfield et al. |
| 5,638,487 A | 6/1997 | Chigier |
| 5,644,404 A | 7/1997 | Hashimoto et al. |
| 5,657,461 A | 8/1997 | Harkins et al. |
| 5,673,322 A | 9/1997 | Pepe et al. |
| 5,675,507 A | 10/1997 | Bobo, II |
| 5,675,733 A | 10/1997 | Williams |
| 5,677,955 A | 10/1997 | Doggett et al. |
| 5,694,616 A | 12/1997 | Johnson et al. |
| 5,696,822 A | 12/1997 | Nachenberg |
| 5,706,442 A | 1/1998 | Anderson et al. |
| 5,708,780 A | 1/1998 | Levergood et al. |
| 5,708,826 A | 1/1998 | Ikeda et al. |
| 5,710,883 A | 1/1998 | Hong et al. |
| 5,727,156 A | 3/1998 | Herr-Hoyman et al. |
| 5,740,231 A | 4/1998 | Cohn et al. |
| 5,742,759 A | 4/1998 | Nessett et al. |
| 5,742,769 A | 4/1998 | Lee et al. |
| 5,745,574 A | 4/1998 | Muftic |
| 5,751,956 A | 5/1998 | Kirsch |
| 5,758,343 A | 5/1998 | Vigil et al. |
| 5,764,906 A | 6/1998 | Edelstein et al. |
| 5,768,528 A | 6/1998 | Stumm |
| 5,768,552 A | 6/1998 | Jacoby |
| 5,771,348 A | 6/1998 | Kubatzki et al. |
| 5,778,372 A | 7/1998 | Cordell et al. |
| 5,781,857 A | 7/1998 | Hwang et al. |
| 5,781,901 A | 7/1998 | Kuzma |
| 5,790,789 A | 8/1998 | Suarez |
| 5,790,790 A | 8/1998 | Smith et al. |
| 5,790,793 A | 8/1998 | Higley |
| 5,793,763 A | 8/1998 | Mayes et al. |
| 5,793,972 A | 8/1998 | Shane |
| 5,796,942 A | 8/1998 | Esbensen |
| 5,796,948 A | 8/1998 | Cohen |
| 5,801,700 A | 9/1998 | Ferguson |
| 5,805,719 A | 9/1998 | Pare, Jr. et al. |
| 5,812,398 A | 9/1998 | Nielsen |
| 5,812,776 A | 9/1998 | Gifford |
| 5,822,526 A | 10/1998 | Waskiewicz |
| 5,822,527 A | 10/1998 | Post |
| 5,826,013 A | 10/1998 | Nachenberg |
| 5,826,014 A | 10/1998 | Coley et al. |
| 5,826,022 A | 10/1998 | Nielsen |
| 5,826,029 A | 10/1998 | Gore, Jr. et al. |
| 5,835,087 A | 11/1998 | Herz et al. |
| 5,845,084 A | 12/1998 | Cordell et al. |
| 5,850,442 A | 12/1998 | Muftic |
| 5,855,020 A | 12/1998 | Kirsch |
| 5,860,068 A | 1/1999 | Cook |
| 5,862,325 A | 1/1999 | Reed et al. |
| 5,864,852 A | 1/1999 | Luotonen |
| 5,878,230 A | 3/1999 | Weber et al. |
| 5,884,033 A | 3/1999 | Duvall et al. |
| 5,892,825 A | 4/1999 | Mages et al. |
| 5,893,114 A | 4/1999 | Hashimoto et al. |
| 5,896,499 A | 4/1999 | McKelvey |
| 5,898,830 A | 4/1999 | Wesinger et al. |
| 5,898,836 A | 4/1999 | Freivald et al. |
| 5,903,723 A | 5/1999 | Beck et al. |
| 5,911,776 A | 6/1999 | Guck |
| 5,923,846 A | 7/1999 | Gage et al. |
| 5,930,479 A | 7/1999 | Hall |
| 5,933,478 A | 8/1999 | Ozaki et al. |
| 5,933,498 A | 8/1999 | Schneck et al. |
| 5,937,164 A | 8/1999 | Mages et al. |
| 5,940,591 A | 8/1999 | Boyle et al. |
| 5,948,062 A | 9/1999 | Tzelnic et al. |
| 5,958,005 A | 9/1999 | Thorne et al. |
| 5,963,915 A | 10/1999 | Kirsch |
| 5,978,799 A | 11/1999 | Hirsch |
| 5,987,609 A | 11/1999 | Hasebe |
| 5,987,610 A | 11/1999 | Franczek et al. |
| 5,991,881 A | 11/1999 | Conklin et al. |
| 5,999,932 A | 12/1999 | Paul |
| 6,003,027 A | 12/1999 | Prager |
| 6,006,329 A | 12/1999 | Chi |
| 6,012,144 A | 1/2000 | Pickett |
| 6,014,651 A | 1/2000 | Crawford |
| 6,023,723 A | 2/2000 | McCormick et al. |
| 6,029,256 A | 2/2000 | Kouznetsov |
| 6,035,423 A | 3/2000 | Hodges et al. |
| 6,052,709 A | 4/2000 | Paul |
| 6,052,784 A | 4/2000 | Day |
| 6,058,381 A | 5/2000 | Nelson |
| 6,058,482 A | 5/2000 | Liu |
| 6,061,448 A | 5/2000 | Smith et al. |
| 6,061,722 A | 5/2000 | Lipa et al. |
| 6,072,942 A | 6/2000 | Stockwell et al. |
| 6,073,142 A | 6/2000 | Geiger et al. |
| 6,088,804 A | 7/2000 | Hill et al. |
| 6,092,114 A | 7/2000 | Shaffer et al. |
| 6,092,194 A | 7/2000 | Touboul |
| 6,094,277 A | 7/2000 | Toyoda |
| 6,094,731 A | 7/2000 | Waldin et al. |
| 6,104,500 A | 8/2000 | Alam et al. |
| 6,108,688 A | 8/2000 | Nielsen |
| 6,108,691 A | 8/2000 | Lee et al. |
| 6,108,786 A | 8/2000 | Knowlson |
| 6,118,856 A | 9/2000 | Paarsmarkt et al. |
| 6,118,886 A | 9/2000 | Baumgart et al. |
| 6,119,137 A | 9/2000 | Smith et al. |

(56) References Cited

U.S. PATENT DOCUMENTS

| | | |
|---|---|---|
| 6,119,142 A | 9/2000 | Kosaka |
| 6,119,230 A | 9/2000 | Carter |
| 6,119,236 A | 9/2000 | Shipley |
| 6,122,661 A | 9/2000 | Stedman et al. |
| 6,141,695 A | 10/2000 | Sekiguchi et al. |
| 6,141,778 A | 10/2000 | Kane et al. |
| 6,145,083 A | 11/2000 | Shaffer et al. |
| 6,151,675 A | 11/2000 | Smith |
| 6,161,130 A | 12/2000 | Horvitz et al. |
| 6,165,314 A | 12/2000 | Gardner et al. |
| 6,185,314 B1 | 2/2001 | Crabtree et al. |
| 6,185,680 B1 | 2/2001 | Shimbo et al. |
| 6,185,689 B1 | 2/2001 | Todd, Sr. et al. |
| 6,192,360 B1 | 2/2001 | Dumais et al. |
| 6,192,407 B1 | 2/2001 | Smith et al. |
| 6,199,102 B1 | 3/2001 | Cobb |
| 6,202,157 B1 | 3/2001 | Brownlie et al. |
| 6,219,714 B1 | 4/2001 | Inhwan et al. |
| 6,223,213 B1 | 4/2001 | Cleron et al. |
| 6,247,045 B1 | 6/2001 | Shaw et al. |
| 6,249,575 B1 | 6/2001 | Heilmann et al. |
| 6,249,807 B1 | 6/2001 | Shaw et al. |
| 6,260,043 B1 | 7/2001 | Puri et al. |
| 6,266,668 B1 | 7/2001 | Vanderveldt et al. |
| 6,269,447 B1 | 7/2001 | Maloney et al. |
| 6,269,456 B1 | 7/2001 | Hodges et al. |
| 6,272,532 B1 | 8/2001 | Feinleib |
| 6,275,942 B1 | 8/2001 | Bernhard et al. |
| 6,279,113 B1 | 8/2001 | Vaidya |
| 6,279,133 B1 | 8/2001 | Vafai et al. |
| 6,282,565 B1 | 8/2001 | Shaw et al. |
| 6,285,991 B1 | 9/2001 | Powar |
| 6,289,214 B1 | 9/2001 | Backstrom |
| 6,298,445 B1 | 10/2001 | Shostack et al. |
| 6,301,668 B1 | 10/2001 | Gleichauf et al. |
| 6,304,898 B1 | 10/2001 | Shiigi |
| 6,304,973 B1 | 10/2001 | Williams |
| 6,311,207 B1 | 10/2001 | Mighdoll et al. |
| 6,317,829 B1 | 11/2001 | Van Oorschot |
| 6,320,948 B1 | 11/2001 | Heilmann et al. |
| 6,321,267 B1 | 11/2001 | Donaldson |
| 6,324,569 B1 | 11/2001 | Ogilvie et al. |
| 6,324,647 B1 | 11/2001 | Bowman-Amuah |
| 6,324,656 B1 | 11/2001 | Gleichauf et al. |
| 6,330,589 B1 | 12/2001 | Kennedy |
| 6,347,374 B1 | 2/2002 | Drake et al. |
| 6,353,886 B1 | 3/2002 | Howard et al. |
| 6,363,489 B1 | 3/2002 | Comay et al. |
| 6,370,648 B1 | 4/2002 | Diep |
| 6,373,950 B1 | 4/2002 | Rowney |
| 6,385,655 B1 | 5/2002 | Smith et al. |
| 6,393,465 B2 | 5/2002 | Leeds |
| 6,393,568 B1 | 5/2002 | Ranger et al. |
| 6,405,318 B1 | 6/2002 | Rowland |
| 6,434,624 B1 | 8/2002 | Gai et al. |
| 6,442,588 B1 | 8/2002 | Clark et al. |
| 6,442,686 B1 | 8/2002 | McArdle et al. |
| 6,453,345 B2 | 9/2002 | Trcka et al. |
| 6,460,050 B1 | 10/2002 | Pace et al. |
| 6,460,141 B1 | 10/2002 | Olden |
| 6,470,086 B1 | 10/2002 | Smith |
| 6,487,599 B1 | 11/2002 | Smith et al. |
| 6,487,666 B1 | 11/2002 | Shanklin et al. |
| 6,502,191 B1 | 12/2002 | Smith et al. |
| 6,516,411 B2 | 2/2003 | Smith |
| 6,519,703 B1 | 2/2003 | Joyce |
| 6,539,430 B1 | 3/2003 | Humes |
| 6,546,416 B1 | 4/2003 | Kirsch |
| 6,546,493 B1 | 4/2003 | Magdych et al. |
| 6,550,012 B1 | 4/2003 | Villa et al. |
| 6,574,737 B1 | 6/2003 | Kingsford et al. |
| 6,578,025 B1 | 6/2003 | Pollack et al. |
| 6,609,196 B1 | 8/2003 | Dickinson, III et al. |
| 6,636,946 B2 | 10/2003 | Jeddeloh |
| 6,650,890 B1 | 11/2003 | Irlam et al. |
| 6,654,787 B1 | 11/2003 | Aronson et al. |
| 6,661,353 B1 | 12/2003 | Gopen |
| 6,662,170 B1 | 12/2003 | Dom et al. |
| 6,675,153 B1 | 1/2004 | Cook et al. |
| 6,681,331 B1 | 1/2004 | Munson et al. |
| 6,687,687 B1 | 2/2004 | Smadja |
| 6,697,950 B1 | 2/2004 | Ko |
| 6,701,440 B1 | 3/2004 | Kim et al. |
| 6,704,874 B1 | 3/2004 | Porras et al. |
| 6,711,127 B1 | 3/2004 | Gorman et al. |
| 6,711,687 B1 | 3/2004 | Sekiguchi |
| 6,725,377 B1 | 4/2004 | Kouznetsov |
| 6,732,101 B1 | 5/2004 | Cook |
| 6,732,157 B1 | 5/2004 | Gordon et al. |
| 6,735,703 B1 | 5/2004 | Kilpatrick et al. |
| 6,738,462 B1 | 5/2004 | Brunson |
| 6,742,116 B1 | 5/2004 | Matsui et al. |
| 6,742,124 B1 | 5/2004 | Kilpatrick et al. |
| 6,742,128 B1 | 5/2004 | Joiner |
| 6,754,705 B2 | 6/2004 | Joiner et al. |
| 6,757,830 B1 | 6/2004 | Tarbotton et al. |
| 6,760,309 B1 | 7/2004 | Rochberger et al. |
| 6,768,991 B2 | 7/2004 | Hearnden |
| 6,769,016 B2 | 7/2004 | Rothwell et al. |
| 6,772,196 B1 | 8/2004 | Kirsch et al. |
| 6,775,657 B1 | 8/2004 | Baker |
| 6,792,546 B1 | 9/2004 | Shanklin et al. |
| 6,880,156 B1 | 4/2005 | Landherr et al. |
| 6,892,178 B1 | 5/2005 | Zacharia |
| 6,892,179 B1 | 5/2005 | Zacharia |
| 6,892,237 B1 | 5/2005 | Gai et al. |
| 6,895,385 B1 | 5/2005 | Zacharia et al. |
| 6,895,438 B1 | 5/2005 | Ulrich |
| 6,907,430 B2 | 6/2005 | Chong et al. |
| 6,910,135 B1 | 6/2005 | Grainger |
| 6,928,556 B2 | 8/2005 | Black et al. |
| 6,941,348 B2 | 9/2005 | Petry et al. |
| 6,941,467 B2 | 9/2005 | Judge et al. |
| 6,968,461 B1 | 11/2005 | Lucas et al. |
| 6,981,143 B2 | 12/2005 | Mullen et al. |
| 7,051,077 B2 | 5/2006 | Lin |
| 7,076,527 B2 | 7/2006 | Bellegarda et al. |
| 7,089,428 B2 | 8/2006 | Farley et al. |
| 7,089,590 B2 | 8/2006 | Judge et al. |
| 7,092,992 B1 | 8/2006 | Yu |
| 7,093,129 B1 | 8/2006 | Gavagni et al. |
| 7,096,498 B2 | 8/2006 | Judge |
| 7,117,358 B2 | 10/2006 | Bandini et al. |
| 7,124,372 B2 | 10/2006 | Brin |
| 7,124,438 B2 | 10/2006 | Judge et al. |
| 7,131,003 B2 | 10/2006 | Lord et al. |
| 7,143,213 B2 | 11/2006 | Need et al. |
| 7,152,105 B2 | 12/2006 | McClure et al. |
| 7,155,243 B2 | 12/2006 | Baldwin et al. |
| 7,164,678 B2 | 1/2007 | Connor |
| 7,206,814 B2 | 4/2007 | Kirsch |
| 7,209,954 B1 | 4/2007 | Rothwell et al. |
| 7,213,260 B2 | 5/2007 | Judge |
| 7,219,131 B2 | 5/2007 | Banister et al. |
| 7,225,466 B2 | 5/2007 | Judge |
| 7,254,608 B2 | 8/2007 | Yeager et al. |
| 7,254,712 B2 | 8/2007 | Godfrey et al. |
| 7,260,840 B2 | 8/2007 | Swander et al. |
| 7,272,149 B2 | 9/2007 | Bly et al. |
| 7,272,853 B2 | 9/2007 | Goodman et al. |
| 7,278,159 B2 | 10/2007 | Kaashoek et al. |
| 7,349,332 B1 | 3/2008 | Srinivasan et al. |
| 7,376,731 B2 | 5/2008 | Kahn et al. |
| 7,379,900 B1 | 5/2008 | Wren |
| 7,385,924 B1 | 6/2008 | Riddle |
| 7,458,098 B2 | 11/2008 | Judge et al. |
| 7,460,476 B1 | 12/2008 | Morris et al. |
| 7,461,339 B2 | 12/2008 | Liao et al. |
| 7,496,634 B1 | 2/2009 | Cooley |
| 7,502,829 B2 | 3/2009 | Radatti et al. |
| 7,506,155 B1 | 3/2009 | Stewart et al. |
| 7,519,563 B1 | 4/2009 | Urmanov et al. |
| 7,519,994 B2 | 4/2009 | Judge et al. |
| 7,522,516 B1 | 4/2009 | Parker |

(56) References Cited

U.S. PATENT DOCUMENTS

| | | |
|---|---|---|
| 7,523,092 B2 | 4/2009 | Andreev et al. |
| 7,543,053 B2 | 6/2009 | Goodman et al. |
| 7,543,056 B2 | 6/2009 | McClure et al. |
| 7,545,748 B1 | 6/2009 | Riddle |
| 7,610,344 B2 | 10/2009 | Mehr et al. |
| 7,617,160 B1 | 11/2009 | Grove et al. |
| 7,620,986 B1 | 11/2009 | Jagannathan et al. |
| 7,624,448 B2 | 11/2009 | Coffman |
| 7,644,127 B2 | 1/2010 | Yu |
| 7,647,411 B1 | 1/2010 | Schiavone et al. |
| 7,668,951 B2 | 2/2010 | Lund et al. |
| 7,693,947 B2 | 4/2010 | Judge et al. |
| 7,694,128 B2 | 4/2010 | Judge et al. |
| 7,711,684 B2 | 5/2010 | Sundaresan et al. |
| 7,716,310 B2 | 5/2010 | Foti |
| 7,730,316 B1 | 6/2010 | Baccash |
| 7,739,253 B1 | 6/2010 | Yanovsky et al. |
| 7,748,038 B2 | 6/2010 | Olivier et al. |
| 7,779,156 B2 | 8/2010 | Alperovitch et al. |
| 7,779,466 B2 | 8/2010 | Judge et al. |
| 7,870,203 B2 | 1/2011 | Judge et al. |
| 7,899,866 B1 | 3/2011 | Buckingham et al. |
| 7,903,549 B2 | 3/2011 | Judge et al. |
| 7,917,627 B1 | 3/2011 | Andriantsiferana et al. |
| 7,937,480 B2 | 5/2011 | Alperovitch et al. |
| 7,941,523 B2 | 5/2011 | Andreev et al. |
| 7,949,716 B2 | 5/2011 | Alperovitch et al. |
| 7,949,992 B2 | 5/2011 | Andreev et al. |
| 7,966,335 B2 | 6/2011 | Sundaresan et al. |
| 8,042,149 B2 | 10/2011 | Judge |
| 8,042,181 B2 | 10/2011 | Judge |
| 8,045,458 B2 | 10/2011 | Alperovitch et al. |
| 8,051,134 B1 | 11/2011 | Begeja et al. |
| 8,069,481 B2 | 11/2011 | Judge |
| 8,079,087 B1 | 12/2011 | Spies et al. |
| 8,095,876 B1 | 1/2012 | Verstak et al. |
| 8,132,250 B2 | 3/2012 | Judge et al. |
| 8,160,975 B2 | 4/2012 | Tang et al. |
| 8,179,798 B2 | 5/2012 | Alperovitch et al. |
| 8,185,930 B2 | 5/2012 | Alperovitch et al. |
| 8,214,497 B2 | 7/2012 | Alperovitch et al. |
| 2001/0037311 A1 | 11/2001 | McCoy et al. |
| 2001/0049793 A1 | 12/2001 | Sugimoto |
| 2002/0004902 A1 | 1/2002 | Toh et al. |
| 2002/0009079 A1 | 1/2002 | Jugck et al. |
| 2002/0013692 A1 | 1/2002 | Chandhok et al. |
| 2002/0016824 A1 | 2/2002 | Leeds |
| 2002/0016910 A1 | 2/2002 | Wright et al. |
| 2002/0023089 A1 | 2/2002 | Woo |
| 2002/0023140 A1 | 2/2002 | Hile et al. |
| 2002/0026591 A1 | 2/2002 | Hartley et al. |
| 2002/0032871 A1 | 3/2002 | Malan et al. |
| 2002/0035683 A1 | 3/2002 | Kaashoek et al. |
| 2002/0042876 A1 | 4/2002 | Smith |
| 2002/0046041 A1 | 4/2002 | Lang |
| 2002/0049853 A1 | 4/2002 | Chu et al. |
| 2002/0051575 A1 | 5/2002 | Myers et al. |
| 2002/0059454 A1 | 5/2002 | Barrett et al. |
| 2002/0062368 A1 | 5/2002 | Holtzman et al. |
| 2002/0078382 A1 | 6/2002 | Sheikh et al. |
| 2002/0087882 A1 | 7/2002 | Schneier et al. |
| 2002/0095492 A1 | 7/2002 | Kaashoek et al. |
| 2002/0112013 A1 | 8/2002 | Walsh |
| 2002/0112185 A1 | 8/2002 | Hodges |
| 2002/0116627 A1 | 8/2002 | Tarbotton et al. |
| 2002/0120853 A1 | 8/2002 | Tyree |
| 2002/0133365 A1 | 9/2002 | Grey et al. |
| 2002/0138416 A1 | 9/2002 | Lovejoy et al. |
| 2002/0138755 A1 | 9/2002 | Ko |
| 2002/0138759 A1 | 9/2002 | Dutta |
| 2002/0138762 A1 | 9/2002 | Horne |
| 2002/0143963 A1 | 10/2002 | Converse et al. |
| 2002/0147734 A1 | 10/2002 | Shoup et al. |
| 2002/0152399 A1 | 10/2002 | Smith |
| 2002/0165971 A1 | 11/2002 | Baron |
| 2002/0169954 A1 | 11/2002 | Bandini et al. |
| 2002/0172367 A1 | 11/2002 | Mulder et al. |
| 2002/0178227 A1 | 11/2002 | Matsa et al. |
| 2002/0178383 A1 | 11/2002 | Hrabik et al. |
| 2002/0178410 A1 | 11/2002 | Haitsma et al. |
| 2002/0188732 A1 | 12/2002 | Buckman et al. |
| 2002/0188864 A1 | 12/2002 | Jackson |
| 2002/0194469 A1 | 12/2002 | Dominique et al. |
| 2002/0199095 A1 | 12/2002 | Bandini et al. |
| 2003/0005326 A1 | 1/2003 | Flemming |
| 2003/0005331 A1 | 1/2003 | Williams |
| 2003/0009554 A1 | 1/2003 | Burch et al. |
| 2003/0009693 A1 | 1/2003 | Brock et al. |
| 2003/0009696 A1 | 1/2003 | Bunker et al. |
| 2003/0009699 A1 | 1/2003 | Gupta et al. |
| 2003/0014664 A1 | 1/2003 | Hentunen |
| 2003/0023692 A1 | 1/2003 | Moroo |
| 2003/0023695 A1 | 1/2003 | Kobata et al. |
| 2003/0023736 A1 | 1/2003 | Abkemeier |
| 2003/0023873 A1 | 1/2003 | Ben-Itzhak |
| 2003/0023874 A1 | 1/2003 | Prokupets et al. |
| 2003/0023875 A1 | 1/2003 | Hursey et al. |
| 2003/0028803 A1 | 2/2003 | Bunker et al. |
| 2003/0033516 A1 | 2/2003 | Howard et al. |
| 2003/0033542 A1 | 2/2003 | Goseva-Popstojanova et al. |
| 2003/0041264 A1 | 2/2003 | Black et al. |
| 2003/0046253 A1 | 3/2003 | Shetty et al. |
| 2003/0051026 A1 | 3/2003 | Carter et al. |
| 2003/0051163 A1 | 3/2003 | Bidaud |
| 2003/0051168 A1 | 3/2003 | King et al. |
| 2003/0055931 A1 | 3/2003 | Cravo De Almeida et al. |
| 2003/0061506 A1 | 3/2003 | Cooper et al. |
| 2003/0065943 A1 | 4/2003 | Geis et al. |
| 2003/0084280 A1 | 5/2003 | Bryan et al. |
| 2003/0084320 A1 | 5/2003 | Tarquini et al. |
| 2003/0084323 A1 | 5/2003 | Gales |
| 2003/0084347 A1 | 5/2003 | Luzzatto |
| 2003/0088792 A1 | 5/2003 | Card et al. |
| 2003/0093518 A1 | 5/2003 | Hiraga |
| 2003/0093667 A1 | 5/2003 | Dutta et al. |
| 2003/0093695 A1 | 5/2003 | Dutta |
| 2003/0093696 A1 | 5/2003 | Sugimoto |
| 2003/0095555 A1 | 5/2003 | McNamara et al. |
| 2003/0097439 A1 | 5/2003 | Strayer et al. |
| 2003/0097564 A1 | 5/2003 | Tewari et al. |
| 2003/0105976 A1 | 6/2003 | Copeland, III |
| 2003/0110392 A1 | 6/2003 | Aucsmith et al. |
| 2003/0110396 A1 | 6/2003 | Lewis et al. |
| 2003/0115485 A1 | 6/2003 | Milliken |
| 2003/0115486 A1 | 6/2003 | Choi et al. |
| 2003/0123665 A1 | 7/2003 | Dunstan et al. |
| 2003/0126464 A1 | 7/2003 | McDaniel et al. |
| 2003/0126472 A1 | 7/2003 | Banzhof |
| 2003/0135749 A1 | 7/2003 | Gales et al. |
| 2003/0140137 A1 | 7/2003 | Joiner et al. |
| 2003/0140250 A1 | 7/2003 | Taninaka et al. |
| 2003/0145212 A1 | 7/2003 | Crumly |
| 2003/0145225 A1 | 7/2003 | Bruton, III et al. |
| 2003/0145226 A1 | 7/2003 | Bruton, III et al. |
| 2003/0149887 A1 | 8/2003 | Yadav |
| 2003/0149888 A1 | 8/2003 | Yadav |
| 2003/0152076 A1 | 8/2003 | Lee et al. |
| 2003/0152096 A1 | 8/2003 | Chapman |
| 2003/0154393 A1 | 8/2003 | Young |
| 2003/0154399 A1 | 8/2003 | Zuk et al. |
| 2003/0154402 A1 | 8/2003 | Pandit et al. |
| 2003/0158905 A1 | 8/2003 | Petry et al. |
| 2003/0159069 A1 | 8/2003 | Choi et al. |
| 2003/0159070 A1 | 8/2003 | Mayer et al. |
| 2003/0167308 A1 | 9/2003 | Schran |
| 2003/0167402 A1 | 9/2003 | Stolfo et al. |
| 2003/0172166 A1 | 9/2003 | Judge et al. |
| 2003/0172167 A1 | 9/2003 | Judge et al. |
| 2003/0172289 A1 | 9/2003 | Soppera |
| 2003/0172291 A1 | 9/2003 | Judge et al. |
| 2003/0172292 A1 | 9/2003 | Judge |
| 2003/0172294 A1 | 9/2003 | Judge |
| 2003/0172301 A1 | 9/2003 | Judge et al. |
| 2003/0172302 A1 | 9/2003 | Judge et al. |

(56) References Cited

U.S. PATENT DOCUMENTS

| | | |
|---|---|---|
| 2003/0182421 A1 | 9/2003 | Faybishenko et al. |
| 2003/0187936 A1 | 10/2003 | Bodin et al. |
| 2003/0187996 A1 | 10/2003 | Cardina et al. |
| 2003/0204596 A1 | 10/2003 | Yadav |
| 2003/0204719 A1 | 10/2003 | Ben |
| 2003/0204741 A1 | 10/2003 | Schoen et al. |
| 2003/0212791 A1 | 11/2003 | Pickup |
| 2003/0233328 A1 | 12/2003 | Scott et al. |
| 2004/0015554 A1 | 1/2004 | Wilson |
| 2004/0025044 A1 | 2/2004 | Day |
| 2004/0034794 A1 | 2/2004 | Mayer et al. |
| 2004/0054886 A1 | 3/2004 | Dickinson et al. |
| 2004/0058673 A1 | 3/2004 | Irlam et al. |
| 2004/0059811 A1 | 3/2004 | Sugauchi et al. |
| 2004/0088570 A1 | 5/2004 | Roberts et al. |
| 2004/0098464 A1 | 5/2004 | Koch et al. |
| 2004/0111519 A1 | 6/2004 | Fu et al. |
| 2004/0111531 A1 | 6/2004 | Staniford et al. |
| 2004/0122926 A1 | 6/2004 | Moore et al. |
| 2004/0122967 A1 | 6/2004 | Bressler et al. |
| 2004/0123157 A1 | 6/2004 | Alagna et al. |
| 2004/0061698 A1 | 7/2004 | Dougherty |
| 2004/0128355 A1 | 7/2004 | Chao et al. |
| 2004/0139160 A1 | 7/2004 | Wallace et al. |
| 2004/0139334 A1 | 7/2004 | Wiseman |
| 2004/0165727 A1 | 8/2004 | Moreh et al. |
| 2004/0167968 A1 | 8/2004 | Wilson et al. |
| 2004/0177120 A1 | 9/2004 | Kirsch |
| 2004/0203589 A1 | 10/2004 | Wang et al. |
| 2004/0205135 A1 | 10/2004 | Hallam-Baker et al. |
| 2004/0221062 A1 | 11/2004 | Starbuck et al. |
| 2004/0236884 A1 | 11/2004 | Beetz |
| 2004/0249895 A1 | 12/2004 | Way |
| 2004/0255122 A1 | 12/2004 | Ingerman et al. |
| 2004/0267893 A1 | 12/2004 | Lin |
| 2005/0021738 A1 | 1/2005 | Goeller et al. |
| 2005/0021997 A1 | 1/2005 | Beynon et al. |
| 2005/0033742 A1 | 2/2005 | Kamvar et al. |
| 2005/0052998 A1 | 3/2005 | Oliver et al. |
| 2005/0060295 A1 | 3/2005 | Gould et al. |
| 2005/0060643 A1 | 3/2005 | Glass et al. |
| 2005/0065810 A1 | 3/2005 | Bouron |
| 2005/0086300 A1 | 4/2005 | Yaeger et al. |
| 2005/0091319 A1 | 4/2005 | Kirsch |
| 2005/0091320 A1 | 4/2005 | Kirsch et al. |
| 2005/0102366 A1 | 5/2005 | Kirsch |
| 2005/0120019 A1 | 6/2005 | Rigoutsos et al. |
| 2005/0141427 A1 | 6/2005 | Bartkay |
| 2005/0149383 A1 | 7/2005 | Zacharia et al. |
| 2005/0159998 A1 | 7/2005 | Buyukkokten et al. |
| 2005/0160148 A1 | 7/2005 | Yu |
| 2005/0192958 A1 | 9/2005 | Widjojo et al. |
| 2005/0193076 A1 | 9/2005 | Flury et al. |
| 2005/0198159 A1 | 9/2005 | Kirsch |
| 2005/0204001 A1 | 9/2005 | Stein et al. |
| 2005/0216564 A1 | 9/2005 | Myers et al. |
| 2005/0256866 A1 | 11/2005 | Lu et al. |
| 2005/0262209 A1 | 11/2005 | Yu |
| 2005/0262210 A1 | 11/2005 | Yu |
| 2005/0262556 A1 | 11/2005 | Waisman et al. |
| 2006/0007936 A1 | 1/2006 | Shrum et al. |
| 2006/0009994 A1 | 1/2006 | Hogg et al. |
| 2006/0015563 A1 | 1/2006 | Judge et al. |
| 2006/0015942 A1 | 1/2006 | Judge et al. |
| 2006/0021055 A1 | 1/2006 | Judge et al. |
| 2006/0023940 A1 | 2/2006 | Katsuyama |
| 2006/0031314 A1 | 2/2006 | Brahms et al. |
| 2006/0031483 A1 | 2/2006 | Lund et al. |
| 2006/0036693 A1 | 2/2006 | Hulten et al. |
| 2006/0036727 A1 | 2/2006 | Kurapati et al. |
| 2006/0041508 A1 | 2/2006 | Pham et al. |
| 2006/0042483 A1 | 3/2006 | Work et al. |
| 2006/0047794 A1 | 3/2006 | Jezierski |
| 2006/0059238 A1 | 3/2006 | Slater et al. |
| 2006/0095404 A1 | 5/2006 | Adelman et al. |
| 2006/0095586 A1 | 5/2006 | Adelman et al. |
| 2006/0112026 A1 | 5/2006 | Graf et al. |
| 2006/0123083 A1 | 6/2006 | Goutte et al. |
| 2006/0129810 A1 | 6/2006 | Jeong et al. |
| 2006/0149821 A1 | 7/2006 | Rajan et al. |
| 2006/0155553 A1 | 7/2006 | Brohman et al. |
| 2006/0168024 A1 | 7/2006 | Mehr et al. |
| 2006/0174337 A1 | 8/2006 | Bernoth |
| 2006/0174341 A1 | 8/2006 | Judge |
| 2006/0179113 A1 | 8/2006 | Buckingham et al. |
| 2006/0184632 A1 | 8/2006 | Marino et al. |
| 2006/0191002 A1 | 8/2006 | Lee et al. |
| 2006/0212925 A1 | 9/2006 | Shull et al. |
| 2006/0212930 A1 | 9/2006 | Shull et al. |
| 2006/0212931 A1 | 9/2006 | Shull et al. |
| 2006/0225136 A1 | 10/2006 | Rounthwaite et al. |
| 2006/0230039 A1 | 10/2006 | Shull et al. |
| 2006/0230134 A1 | 10/2006 | Qian et al. |
| 2006/0248156 A1 | 11/2006 | Judge et al. |
| 2006/0251068 A1 | 11/2006 | Judge et al. |
| 2006/0253447 A1 | 11/2006 | Judge |
| 2006/0253458 A1 | 11/2006 | Dixon et al. |
| 2006/0253578 A1 | 11/2006 | Dixon et al. |
| 2006/0253579 A1 | 11/2006 | Dixon et al. |
| 2006/0253582 A1 | 11/2006 | Dixon et al. |
| 2006/0253584 A1 | 11/2006 | Dixon et al. |
| 2006/0265747 A1 | 11/2006 | Judge |
| 2006/0267802 A1 | 11/2006 | Judge et al. |
| 2006/0277259 A1 | 12/2006 | Murphy et al. |
| 2007/0002831 A1 | 1/2007 | Allen et al. |
| 2007/0019235 A1 | 1/2007 | Lee |
| 2007/0025304 A1 | 2/2007 | Leelahakriengkrai |
| 2007/0027992 A1* | 2/2007 | Judge et al. .................. 709/227 |
| 2007/0028301 A1 | 2/2007 | Shull et al. |
| 2007/0043738 A1 | 2/2007 | Morris et al. |
| 2007/0078675 A1 | 4/2007 | Kaplan |
| 2007/0124803 A1 | 5/2007 | Taraz |
| 2007/0130350 A1 | 6/2007 | Alperovitch et al. |
| 2007/0130351 A1 | 6/2007 | Alperovitch et al. |
| 2007/0168394 A1 | 7/2007 | Vivekanand |
| 2007/0195753 A1 | 8/2007 | Judge et al. |
| 2007/0195779 A1 | 8/2007 | Judge et al. |
| 2007/0199070 A1 | 8/2007 | Hughes |
| 2007/0203997 A1 | 8/2007 | Ingerman et al. |
| 2007/0208817 A1 | 9/2007 | Lund et al. |
| 2007/0214151 A1 | 9/2007 | Thomas et al. |
| 2007/0233787 A1 | 10/2007 | Pagan |
| 2007/0239642 A1 | 10/2007 | Sindhwani et al. |
| 2007/0253412 A1 | 11/2007 | Batteram et al. |
| 2008/0005223 A1 | 1/2008 | Flake et al. |
| 2008/0022384 A1 | 1/2008 | Yee et al. |
| 2008/0047009 A1 | 2/2008 | Overcash et al. |
| 2008/0077517 A1 | 3/2008 | Sappington |
| 2008/0082662 A1 | 4/2008 | Dandliker et al. |
| 2008/0091765 A1 | 4/2008 | Gammage et al. |
| 2008/0103843 A1 | 5/2008 | Goeppert et al. |
| 2008/0104180 A1 | 5/2008 | Gabe |
| 2008/0123823 A1 | 5/2008 | Pirzada et al. |
| 2008/0159632 A1 | 7/2008 | Oliver et al. |
| 2008/0175226 A1 | 7/2008 | Alperovitch et al. |
| 2008/0175266 A1 | 7/2008 | Alperovitch et al. |
| 2008/0177684 A1 | 7/2008 | Laxman et al. |
| 2008/0177691 A1 | 7/2008 | Alperovitch et al. |
| 2008/0178259 A1 | 7/2008 | Alperovitch et al. |
| 2008/0178288 A1 | 7/2008 | Alperovitch et al. |
| 2008/0184366 A1 | 7/2008 | Alperovitch et al. |
| 2008/0301755 A1 | 12/2008 | Sinha et al. |
| 2008/0303689 A1 | 12/2008 | Iverson |
| 2009/0003204 A1 | 1/2009 | Okholm et al. |
| 2009/0089279 A1 | 4/2009 | Jeong et al. |
| 2009/0103524 A1 | 4/2009 | Mantripragada et al. |
| 2009/0113016 A1 | 4/2009 | Sen et al. |
| 2009/0119740 A1 | 5/2009 | Alperovitch et al. |
| 2009/0122699 A1 | 5/2009 | Alperovitch et al. |
| 2009/0125980 A1 | 5/2009 | Alperovitch et al. |
| 2009/0164582 A1 | 6/2009 | Dasgupta et al. |
| 2009/0192955 A1 | 7/2009 | Tang et al. |
| 2009/0254499 A1 | 10/2009 | Deyo |
| 2009/0254572 A1 | 10/2009 | Redlich et al. |

(56) References Cited

U.S. PATENT DOCUMENTS

| | | |
|---|---|---|
| 2009/0254663 A1 | 10/2009 | Alperovitch et al. |
| 2009/0282476 A1 | 11/2009 | Nachenberg et al. |
| 2010/0115040 A1* | 5/2010 | Sargent et al. ............... 709/206 |
| 2010/0306846 A1 | 12/2010 | Alperovitch et al. |
| 2011/0280160 A1 | 11/2011 | Yang |
| 2011/0296519 A1 | 12/2011 | Ide et al. |
| 2012/0011252 A1 | 1/2012 | Alperovitch et al. |
| 2012/0084441 A1 | 4/2012 | Alperovitch et al. |
| 2012/0174219 A1 | 7/2012 | Hernandez et al. |
| 2012/0204265 A1 | 8/2012 | Judge |
| 2012/0216248 A1 | 8/2012 | Alperovitch et al. |
| 2012/0239751 A1 | 9/2012 | Alperovitch et al. |
| 2012/0240228 A1 | 9/2012 | Alperovitch et al. |
| 2012/0271890 A1 | 10/2012 | Judge et al. |

FOREIGN PATENT DOCUMENTS

| | | |
|---|---|---|
| AU | 2006315184 | 5/2007 |
| AU | 2008207924 | 7/2008 |
| AU | 2008207926 | 7/2008 |
| AU | 2008207930 | 7/2008 |
| AU | 2008323779 | 5/2009 |
| AU | 2008323784 | 5/2009 |
| AU | 2009203095 | 8/2009 |
| CA | 2478299 | 9/2003 |
| CA | 2564533 | 12/2005 |
| CA | 2586709 | 5/2006 |
| CA | 2628189 | 5/2007 |
| CA | 2654796 | 12/2007 |
| CN | 10140166 | 4/2009 |
| CN | 101443736 | 5/2009 |
| CN | 101730892 | 6/2010 |
| CN | 101730904 | 6/2010 |
| CN | 101730903 | 11/2012 |
| CN | 103095672 | 5/2013 |
| EP | 0375138 | 6/1990 |
| EP | 0420779 | 4/1991 |
| EP | 0413537 | 12/1991 |
| EP | 0720333 | 7/1996 |
| EP | 0838774 | 4/1998 |
| EP | 0869652 | 10/1998 |
| EP | 0907120 | 4/1999 |
| EP | 1271846 | 1/2003 |
| EP | 1326376 | 7/2003 |
| EP | 1488316 | 12/2004 |
| EP | 1672558 | 6/2006 |
| EP | 1820101 | 8/2007 |
| EP | 1819108 | 6/2008 |
| EP | 1982540 | 10/2008 |
| EP | 2036246 | 3/2009 |
| EP | 2115642 | 11/2009 |
| EP | 2115689 | 11/2009 |
| EP | 2213056 | 8/2010 |
| EP | 2223258 | 9/2010 |
| EP | 2562975 | 2/2013 |
| EP | 2562976 | 2/2013 |
| EP | 2562986 | 2/2013 |
| EP | 2562987 | 2/2013 |
| GB | 2271002 | 3/1994 |
| GB | 2357932 | 7/2001 |
| IN | 3279-DELNP-2007 | 8/2007 |
| IN | 4233-DELNP-2007 | 8/2008 |
| IN | 4842/CHENP/2009 | 1/2010 |
| IN | 4763/CHENP/2009 | 7/2010 |
| JP | 2000-148276 | 5/2000 |
| JP | 2000-215046 | 8/2000 |
| JP | 2001-028006 | 1/2001 |
| JP | 2003-150482 | 5/2003 |
| JP | 2004-533677 | 11/2004 |
| JP | 2004-537075 | 12/2004 |
| JP | 2005-520230 | 7/2005 |
| JP | 2006-268544 | 10/2006 |
| JP | 2006-350870 | 12/2006 |
| JP | 2007-540073 | 6/2008 |
| JP | 2009-516269 | 4/2009 |
| KR | 10-0447082 | 9/2004 |
| KR | 2006-0012137 | 2/2006 |
| KR | 2006-0028200 | 3/2006 |
| KR | 2006-0028200 | 3/2006 |
| KR | 2006-0041934 | 5/2006 |
| KR | 10-0699531 | 3/2007 |
| KR | 10-699531 | 3/2007 |
| KR | 10-0737523 | 7/2007 |
| KR | 10-737523 | 7/2007 |
| KR | 10-0750377 | 8/2007 |
| KR | 10-750377 | 8/2007 |
| KR | 10-447082 | 12/2009 |
| SG | 106744 | 11/2004 |
| SG | 142513 | 6/2008 |
| WO | WO 96/38994 | 11/1996 |
| WO | WO 99/05814 | 2/1999 |
| WO | WO 99/33188 | 7/1999 |
| WO | WO 99/37066 | 7/1999 |
| WO | WO 00/07312 | 2/2000 |
| WO | WO 00/08543 | 2/2000 |
| WO | WO 00/42748 | 7/2000 |
| WO | WO 00/59167 | 10/2000 |
| WO | WO 01/17165 | 3/2001 |
| WO | WO 01/22686 | 3/2001 |
| WO | WO 01/50691 | 7/2001 |
| WO | WO 01/76181 | 10/2001 |
| WO | WO 01/80480 | 10/2001 |
| WO | WO 01/88834 | 11/2001 |
| WO | WO 02/13469 | 2/2002 |
| WO | WO 02/13489 | 2/2002 |
| WO | WO 02/15521 | 2/2002 |
| WO | WO 02/075547 | 9/2002 |
| WO | WO 02/082293 | 10/2002 |
| WO | WO 02/091706 | 11/2002 |
| WO | WO 03/077071 | 9/2003 |
| WO | WO 2004/061698 | 7/2004 |
| WO | WO 2004/061703 | 7/2004 |
| WO | WO 2004/081734 | 9/2004 |
| WO | WO 2004/088455 | 10/2004 |
| WO | WO 2005/006139 | 1/2005 |
| WO | WO 2005/086437 | 9/2005 |
| WO | WO 2005/116851 | 12/2005 |
| WO | WO 2005/119485 | 12/2005 |
| WO | WO 2005/119488 | 12/2005 |
| WO | WO 2006/029399 | 3/2006 |
| WO | WO 2006/119509 | 3/2006 |
| WO | WO 2006/052736 | 5/2006 |
| WO | WO 2007/030951 | 3/2007 |
| WO | WO 2007/059428 | 5/2007 |
| WO | WO 2007/146690 | 12/2007 |
| WO | WO 2007/146696 | 12/2007 |
| WO | WO 2007/146701 | 12/2007 |
| WO | WO 2008/008543 | 1/2008 |
| WO | WO 2008/091980 | 7/2008 |
| WO | WO 2008/091982 | 7/2008 |
| WO | WO 2008/091986 | 7/2008 |
| WO | WO 2009/146118 | 2/2009 |
| WO | WO 2009/062018 | 5/2009 |
| WO | WO 2009/062023 | 5/2009 |

* cited by examiner

SYSTEMS AND METHODS FOR CLASSIFICATION OF MESSAGING ENTITIES

CROSS-REFERENCE TO RELATED APPLICATIONS

This application claims priority under 35 U.S.C. §119(e) to U.S. Provisional Application Ser. No. 61/334,819 titled "Systems And Methods For Classification Of Messaging Entities" filed May 14, 2010, the disclosure of which is incorporated herein by reference in its entirety.

TECHNICAL FIELD

This disclosure relates to classifying messaging entities and filtering communications.

BACKGROUND

In the anti-spam industry, spammers use various creative means for evading detection by spam filters. Accordingly, spam filter designers adopt a strategy of combining various detection techniques in their filters.

Current tools for message sender analysis include IP blacklists (e.g., real-time blacklists (RBLs)) and IP whitelists (e.g., real-time whitelists (RWLs)). Whitelists and blacklists add value to the spam classification process; however, whitelists and blacklists are inherently limited to providing a binary-type (YES/NO) response to each query. In contrast, a reputation system has the ability to express an opinion of a sender in terms of a scalar number in some defined range. Thus, where blacklists and whitelists are limited to "binary" responses, a reputation system can express "shades of gray" in its response.

SUMMARY

In general, one aspect of the subject matter described in this specification can be embodied in methods that include receiving a communication at the one or more data processor comprising data that identifies a plurality of biasing characteristics related to a messaging entity associated with the communication; analyzing the identified plurality of biasing characteristics related to the messaging entity associated with the communication based upon a plurality of criteria; biasing a reputation score associated with the messaging entity based upon the analysis of the identified plurality of biasing characteristics related to the messaging entity associated with the communication; and determining an action to be taken with respect to a communication associated with the messaging entity based upon the reputation score. Other embodiments of this aspect include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
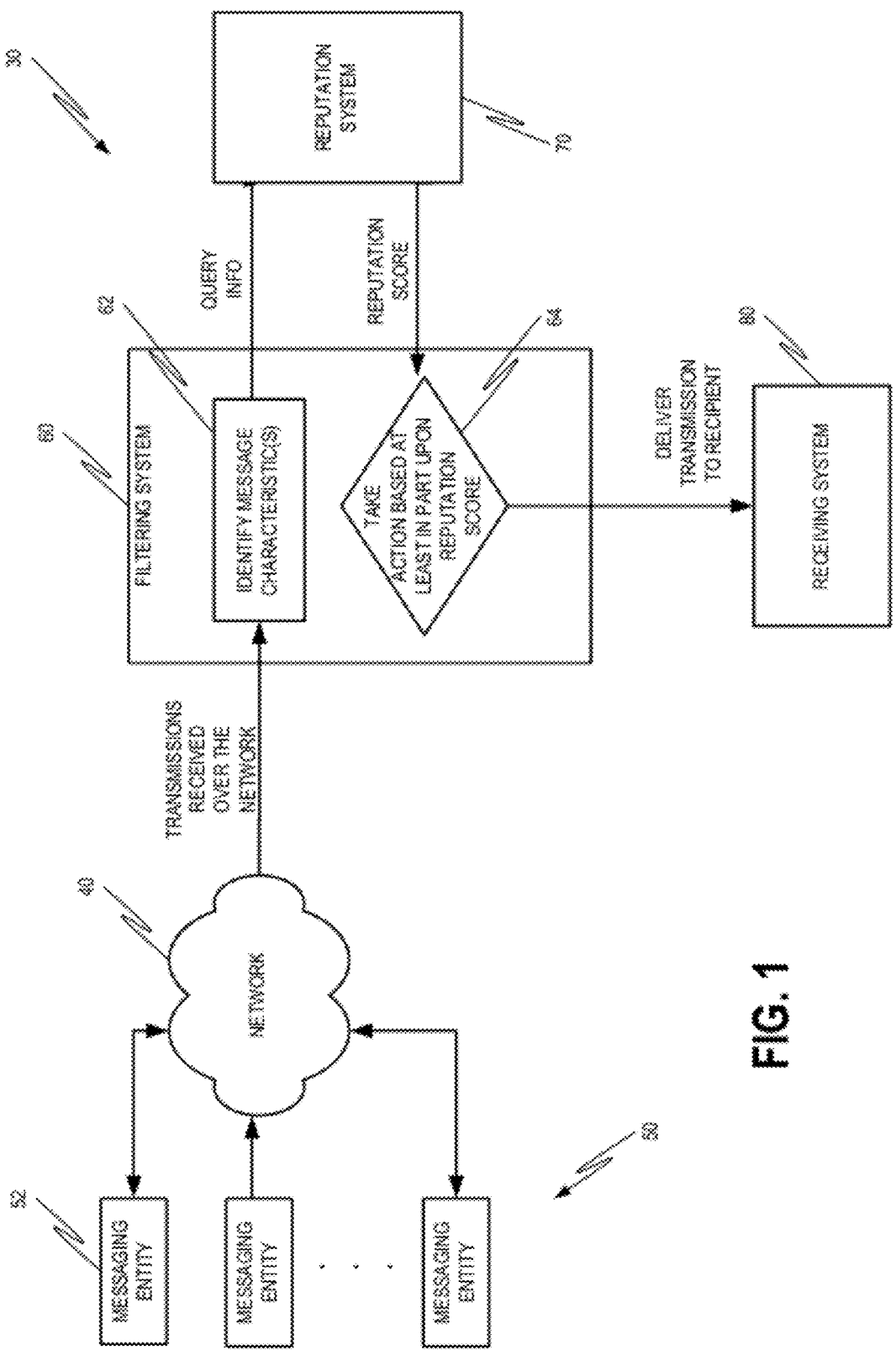
FIG. 1 is a block diagram depicting a system for handling transmissions received over a network.

FIG. 1 depicts at 30 a system for handling transmissions received over a network 40. The transmissions can be many different types of communications, such as electronic mail (e-mail) messages sent from one or more messaging entities 50. The system 30 assigns a classification to a messaging entity (e.g., messaging entity 52), and based upon the classification assigned to the messaging entity, an action is taken with respect to the messaging entity's communication.

The system 30 uses a filtering system 60 and a reputation system 70 to help process communications from the messaging entities 50. The filtering system 60 uses the reputation system 70 to help determine what filtering action (if any) should be taken upon the messaging entities' communications. For example, the communication may be determined to be from a reputable source and thus the communication should not be filtered.

The filtering system 60 identifies at 62 one or more message characteristics associated with a received communication and provides that identification information to the reputation system 70. The reputation system 70 evaluates the reputation by calculating probabilities that the identified message characteristic(s) exhibit certain qualities. An overall reputation score is determined based upon the calculated probabilities and is provided to the filtering system 60.

The filtering system 60 examines at 64 the reputation score in order to determine what action should be taken for the sender's communication (such as whether the communication's transmission should be delivered to the communication's designated recipient located within a message receiving system 80). The filtering system 60 could decide that a communication should be handled differently based in whole or in part upon the reputation scored that was provided by the reputation system 70. As an illustration, a communication may be determined to be from a non-reputable sender and thus the communication should be handled as Spam (e.g., deleted, quarantined, etc.).

Figure 2:
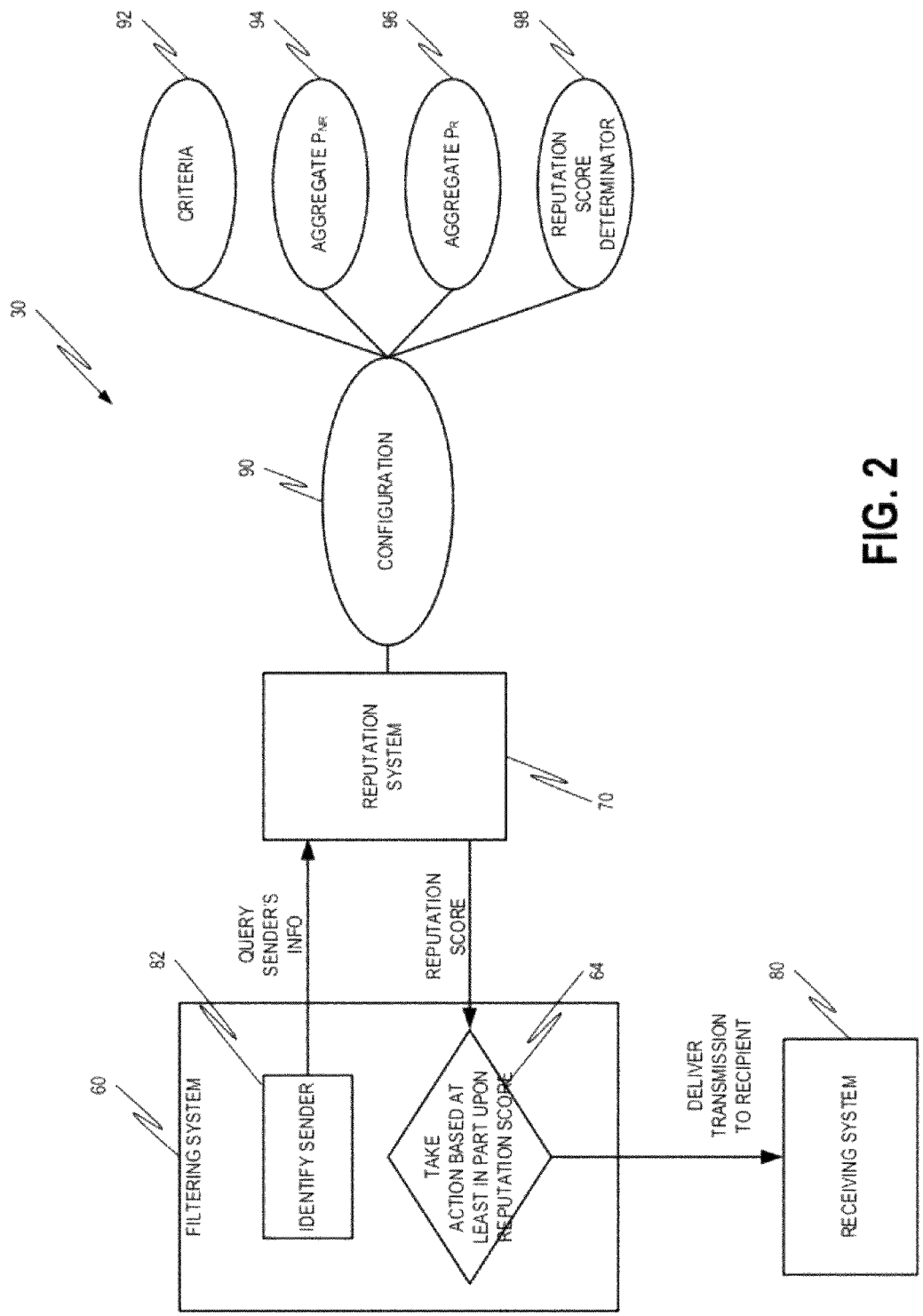
FIG. 2 is a block diagram depicting a reputation system that has been configured for determining reputation scores.

Reputation systems may be configured in many different ways in order to assist a filtering system. For example, a reputation system 70 can be located externally or internally relative to the filtering system 60 depending upon the situation at hand. As another example, FIG. 2 depicts a reputation system 70 that has been configured to calculate reputation scores based upon such message characteristic identification information as sender identity as shown at 82. It should be understood that other message characteristics can be used instead of or in addition to sender identity. Moreover, transmissions may be from many different types of messaging entities, such as a domain name, IP address, phone number, or individual electronic address or username representing an organization, computer, or individual user that transmits electronic messages. For example, generated classifications of reputable and non-reputable can be based upon a tendency for an IP address to send unwanted transmissions or legitimate communication.

The system's configuration 90 could also, as shown in FIG. 2, be established by identifying a set of binary, testable criteria 92 which appear to be strong discriminators between good and bad senders. $P(NR|C_i)$ can be defined as the probability that a sender is non-reputable, given that it conforms to quality/criterion C, and $P(R|C_i)$ can be defined as the probability that a sender is reputable, given that it conforms to quality/criterion $C_i$.

For each quality/criterion C, periodic (e.g., daily, weekly, monthly, etc.) sampling exercises can be performed to recalculate $P(NR|C_i)$. A sampling exercise may include selecting a random sample set S of N senders for which quality/criterion $C_i$ is known to be true. The senders in the sample are then sorted into one of the following sets: reputable (R), non-reputable (NR) or unknown (U). $N_R$ is the number of senders in the sample that are reputable senders, $N_{NR}$ is the number of senders that are non-reputable senders, etc. Then, $P(NR|C_i)$ and $P(R|C_i)$ are estimated using the formulas:

$$P(NR|C_i) = \frac{N_{NR}}{N}$$

$$P(R|C_i) = \frac{N_R}{N}$$

For this purpose, N=30 was determined to be a large enough sample size to achieve an accurate estimate of $P(NR|C_i)$ and $P(R|C_i)$ for each quality/criterion $C_i$.

After calculating $P(NR|C_i)$ and $P(R|C_i)$ for all criteria, the computed probabilities are used to calculate an aggregate non-reputable probability 94, $P_{NR}$, and an aggregate reputable sender probability 96, $P_R$, for each sender in the reputation space. These probabilities can be calculated using the formulas:

$$P_{NR} = \left(1 - \prod_{i=1}^{N} \begin{cases} 1 - P(NR|C_i) & \text{if criterion } i \text{ applies} \\ 1 & \text{otherwise} \end{cases}\right)^{(\#of\ criteria\ that\ apply)}$$

$$P_R = \left(1 - \prod_{i=1}^{N} \begin{cases} 1 - P(R|C_i) & \text{if criterion } i \text{ applies} \\ 1 & \text{otherwise} \end{cases}\right)^{(\#of\ criteria\ that\ apply)}$$

In experimentation, the above formulas appeared to behave very well for a wide range of input criteria combinations, and in practice their behavior appears to be similar to the behavior of the formula for correctly computing naïve joint conditional probabilities of "non-reputable" and "reputable" behavior for the input criteria.

Figure 3:
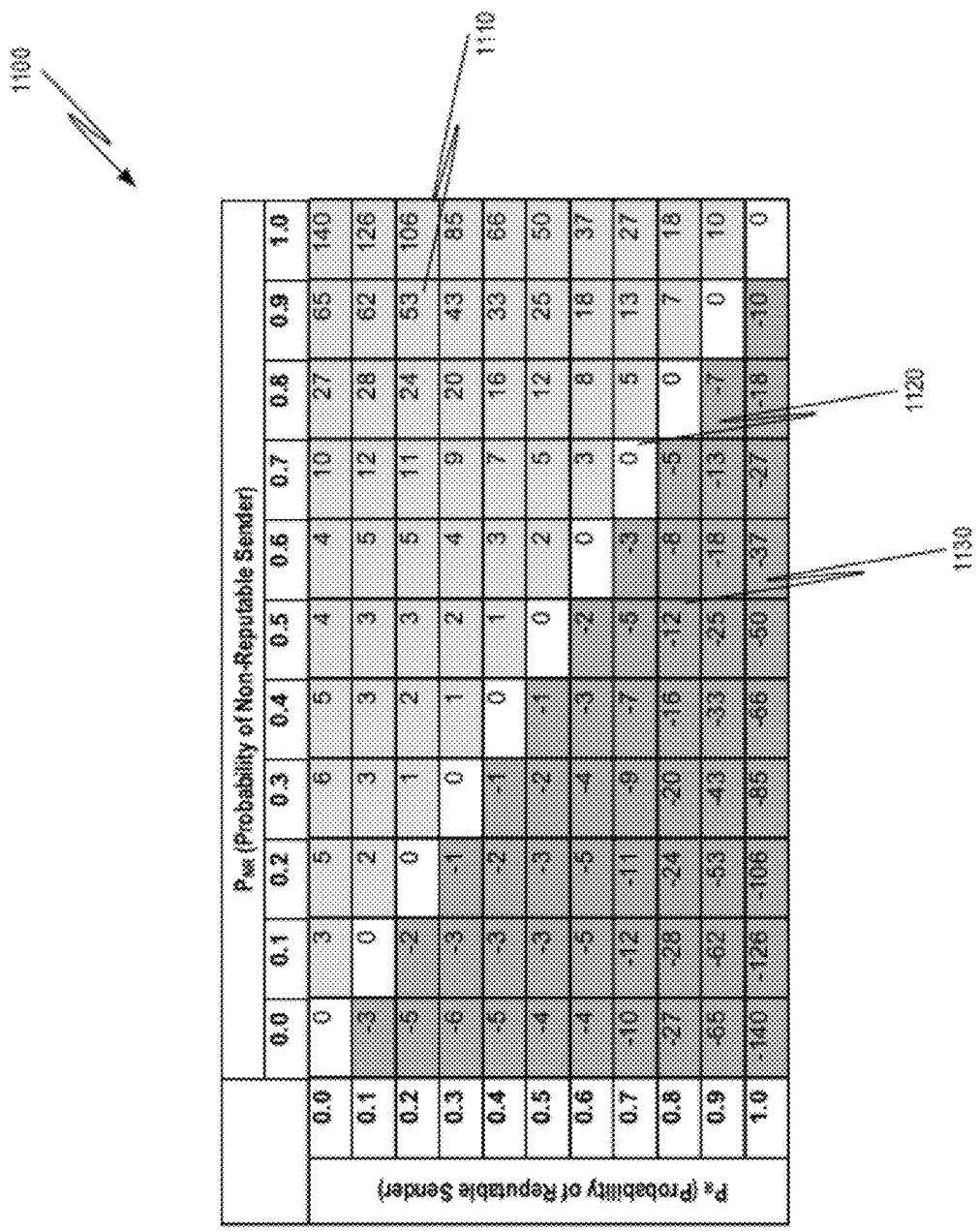
FIG. 3 is a table depicting reputation scores at various calculated probability values.

After calculating $P_{NR}$ and $P_R$ for each sender, a reputation score is calculated for that sender using the following reputation function:

$$f(P_{NR}, P_R) = (c_1 + c_2 P_{NR} + c_2 P_R + c_3 P_{NR}^2 + c_3 P_R^2 + c_4 P_{NR} P_R + c_5 P_{NR}^3 + c_5 P_R^3 + c_6 P_{NR} P_R^2 + c_6 P_{NR}^2 P_R) \\ ((P_{NR} - P_R)^3 \pm c_7 (P_{NR} - P_R))$$

where $c_1 = 86.50$
$c_2 = -193.45$
$c_3 = -35.19$
$c_4 = 581.09$
$c_5 = 234.81$
$c_6 = -233.18$
$c_7 = 0.51$ It should be understood that different functions can act as a reputation score determinator 98 and can be expressed in many different forms in addition to a functional expression. As an illustration, FIG. 3 depicts at 100 a tabular form for determining reputation scores. The table shows reputation scores produced by the above function, based on values of $P_{NR}$ and $P_R$ as they each vary between 0.0 and 1.0. For example as shown at 110, a reputation score of 53 is obtained for the combination of $P_{NR}=0.9$ and $P_R=0.2$. This reputation score is a relatively high indicator that the sender should not be considered reputable. A reputation score of 0 is obtained if $P_{NR}$ and $P_R$ are the same (e.g., the reputation score is 0 if $P_{NR}=0.7$ and $P_R=0.7$ as shown at 120). A reputation score can have a negative value to indicate that a sender is relatively reputable as determined when $P_R$ is greater than $P_{NR}$. For example, if $P_{NR}=0.5$ and $P_R=0.8$ as shown at 130, then the reputation score is −12.

Figure 4:
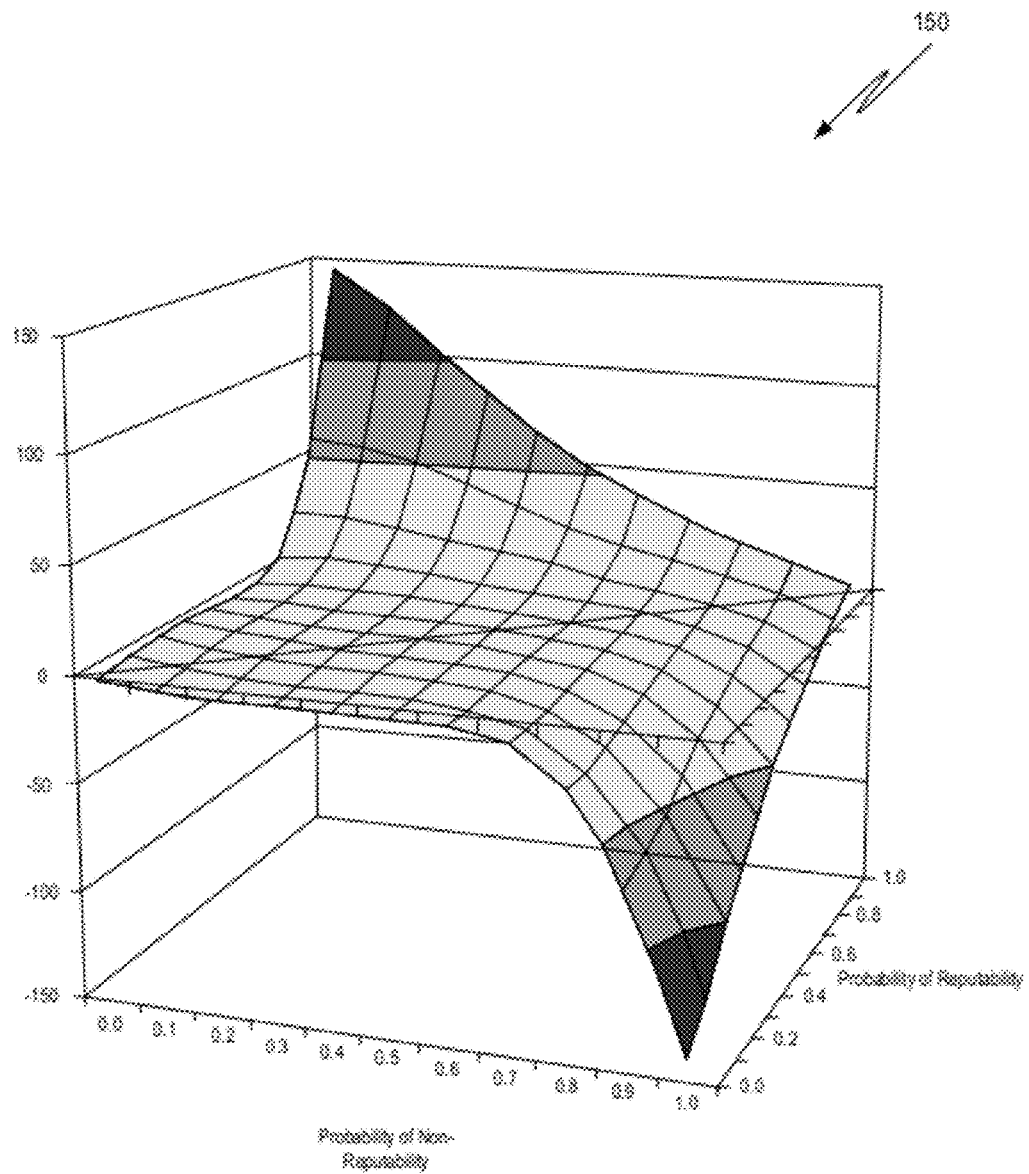
FIG. 4 is a graph depicting reputation scores at various calculated probability values.

Reputation scores can be shown graphically as depicted in FIG. 4 at 150. Graph 150 was produced by the above function, based on values of $P_{NR}$ and $P_R$. FIG. 4 illustrates reputation score determinations in the context of Spam in that the terms $P_{NR}$ and $P_R$ are used respectively as probability of hamminess and probability of spamminess as the probabilities each vary between 0.0 and 1.0.

As shown in these examples, reputation scores can be numeric reputations that are assigned to messaging entities based on characteristics of a communication (e.g., messaging entity characteristic(s)) and/or a messaging entity's behavior. Numeric reputations can fluctuate between a continuous spectrum of reputable and non-reputable classifications. However, reputations may be non-numeric, such as by having textual, or multiple level textual categories.

Figure 5:
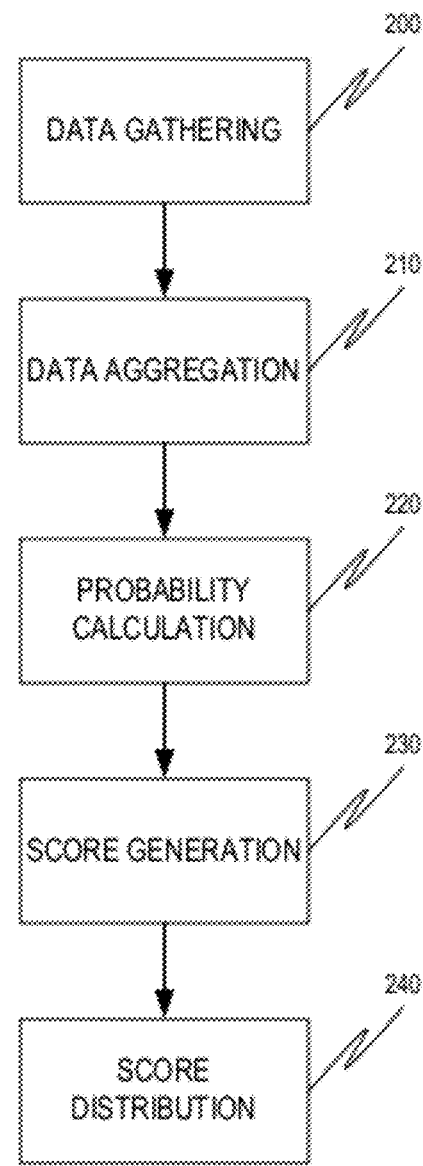
FIG. 5 is a flowchart depicting an operational scenario for generating reputation scores.

FIG. 5 depicts an operational scenario wherein a reputation system is used by a filtering system to generate reputation scores. In this operational scenario, a reputation score is computed for a particular sender (e.g., IP address, domain name, phone number, address, name, etc), from a set of input data. With reference to FIG. 5, data is gathered at step 200 that is needed to calculate non-reputable and reputable probabilities for a sender. The data is then aggregated at step 210 and used in probability calculations at step 220. This includes determining, for a sender, non-reputable probabilities and reputable probabilities for various selected criteria. An aggregate non-reputable probability and an aggregate reputable probability are then calculated for each sender.

After calculating an aggregate non-reputable probability and an aggregate reputable probability for each sender, a reputation score is calculated at 230 for that sender using a reputation function. At step 240, the sender's reputation score is distributed locally and/or to one or more systems to evaluate a communication associated with the sender. As an illustration, reputation scores can be distributed to a filtering system. With the reputation score, the filtering system can choose to take an action on the transmission based on the range the sender reputation score falls into. For unreputable senders, a filtering system can choose to drop the transmission (e.g., silently), save it in a quarantine area, or flag the transmission as suspicious. In addition, a filter system can choose to apply such actions to all future transmissions from this sender for a specified period of time, without requiring new lookup queries to be made to the reputation system. For reputable senders, a filtering system can similarly apply actions to the transmissions to allow them to bypass all or certain filtering techniques that cause significant processing, network, or storage overhead for the filtering system.

It should be understood that similar to the other processing flows described herein, the processing and the order of the processing may be altered, modified and/or augmented and still achieve the desired outcome. For example, an optional addition to the step of extracting unique identifying information about the sender of the transmission would be to use sender authentication techniques to authenticate certain parts of the transmission, such as the purported sending domain name in the header of the message, to unforgeable information about the sender, such as the IP address the transmission originated from. This process can allow the filtering system to perform lookups on the reputation system by querying for information that can potentially be forged, had it not been authenticated, such as a domain name or email address. If such domain or address has a positive reputation, the transmission can be delivered directly to the recipient system bypassing all or some filtering techniques. If it has a negative reputation, the filtering system can choose to drop the transmission, save it in a quarantine area, or flag it as suspicious.

Many different types of sender authentication techniques can be used, such as the Sender Policy Framework (SPF) technique. SPF is a protocol by which domain owners publish DNS records that indicate which IP addresses are allowed to send mail on behalf of a given domain. As other non-limiting examples, SenderID or DomainKeys can be used as sender authentication techniques.

Figure 6:
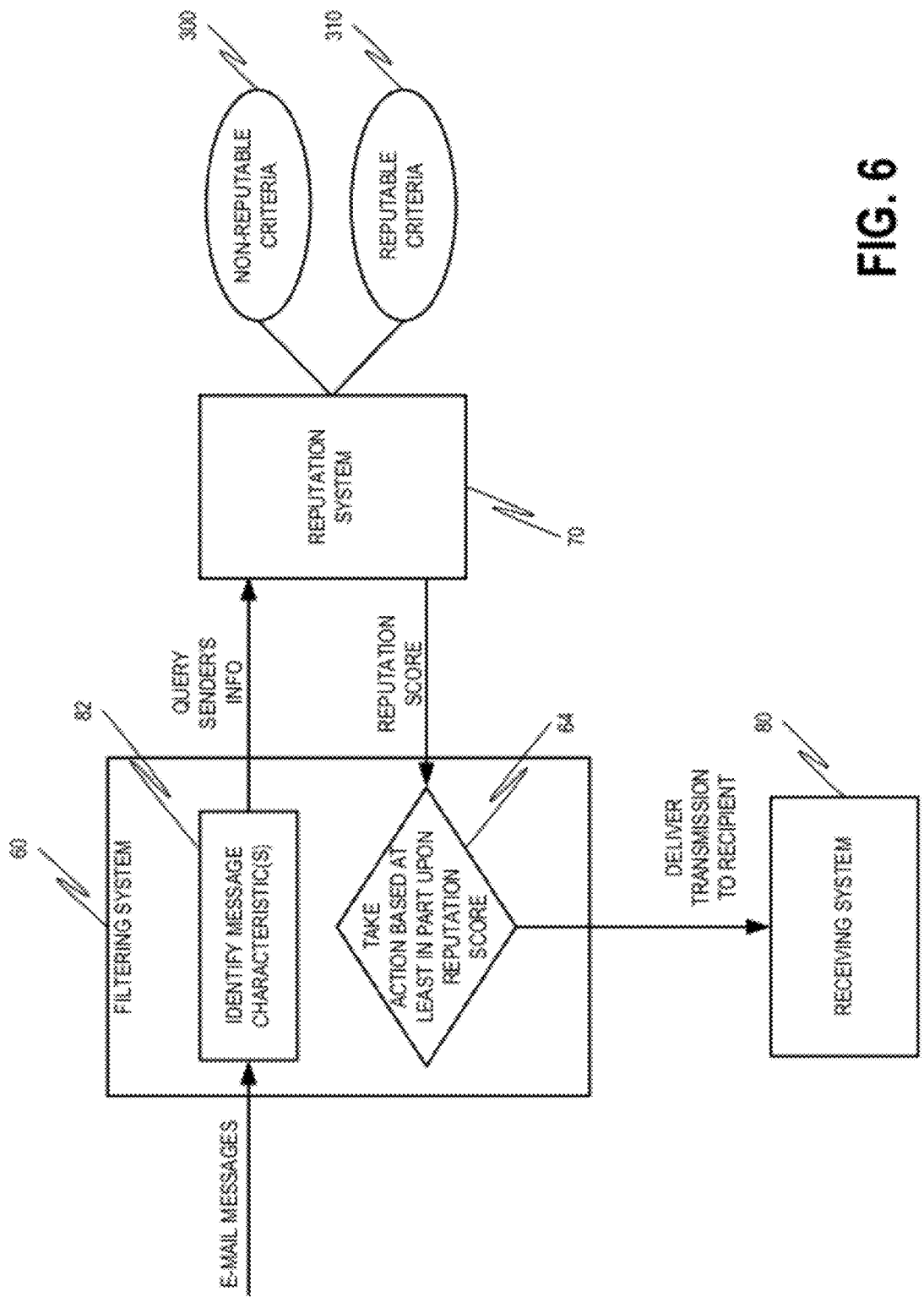
FIG. 6 is a block diagram depicting use of non-reputable criteria and reputable criteria for determining reputation scores.

As another example, many different types of criteria may be used in processing a sender's communication. FIG. 6 depicts the use of non-reputable criteria 300 and reputable criteria 310 for use in determining reputation scores.

The non-reputable criteria 300 and reputable criteria 310 help to distinguish non-reputable senders and reputable senders. A set of criteria can change often without significantly affecting the reputation scores produced using this scoring technique. As an illustration within the context of SPAM identification, the following is a list of spamminess criteria that could be used in the reputation scoring of a message sender. The list is not intended to be exhaustive, and can be adapted to include other criteria or remove criteria based upon observed behavior.

1. Mean Spam Score: A sender is declared "non-reputable" if a mean spam profiler score of transmissions that it sends exceeds some threshold, W.
2. RDNS Lookup Failure: A sender is declared "non-reputable" if reverse domain name system (RDNS) queries for its IP addresses fail.
3. RBL Membership: A sender is declared "non-reputable" if it is included in a real-time blackhole list (RBL). (Note: multiple RBLs may be used. Each RBL can constitute a separate testing criterion.)
4. Mail Volume: A sender is declared "non-reputable" if its average (mean or median) transmission volume exceeds a threshold, X, where X is measured in transmissions over a period of time (such as, e.g., a day, week, or month). (Note: multiple average volumes over multiple time periods may be used, and each average volume can constitute a separate testing criterion.)
5. Mail Burstiness/Sending History: A sender is declared "non-reputable" if its average (mean or median) transmission traffic pattern burstiness (defined by the number of active sending sub-periods within a larger time period, e.g., number of active sending hours in a day or number of active sending days in a month) is less than some threshold, Y, where Y is measured in sub-periods per period. (Note: multiple average burstiness measures over multiple time periods may be used, and each average burstiness measure can constitute a separate testing criterion.)
6. Mail Breadth: A sender is declared "non-reputable" if its average (mean or median) transmission traffic breadth (as defined by the percentage of systems that receive transmissions from the same sender during a period of time (such as, e.g., a day, week, or month)) exceeds some threshold, Z. (Note: multiple average breadths over multiple time periods may be used, and each average breadth measure can constitute a separate testing criterion.)
7. Malware Activity: A sender is declared "non-reputable" if it is known to have delivered one or more malware codes (such as, e.g., viruses, spyware, intrusion code, etc) during a measurement period (e.g., a day, week, or month).
8. Type of Address: A sender is declared "non-reputable" if it is known to be dynamically assigned to dial-up or broadband dynamic host control protocol (DHCP) clients by an internet service provider (ISP).
9. CIDR Block Spamminess: A sender is declared "non-reputable" if its IP addresses are known to exist within classless inter-domain routing (CIDR) blocks that contain predominantly "non-reputable" IP addresses.
10. Human Feedback: A sender is declared "non-reputable" if it is reported to have sent undesirable transmissions by people analyzing the content and other characteristics of those transmissions.
11. SpamTrap Feedback: A sender is declared "non-reputable" if it is sending transmissions to accounts that have been declared as spamtraps and as such are not supposed to receive any legitimate transmissions.
12. Bounceback Feedback: A sender is declared "non-reputable" if it is sending bounceback transmissions or transmissions to accounts that do not exist on the destination system.
13. Legislation/Standards Conformance: A sender is declared "non-reputable" if it is not conforming to laws, regulations, and well-established standards of transmission behavior in the countries of operation of either the sender and/or the recipient of the transmissions.
14. Continuity of Operation: A sender is declared "non-reputable" if it has not operated at that sending location longer than some threshold Z.
15. Responsiveness to Recipient Demands: A sender is declared "non-reputable" if it is not responding in a reasonable timeframe to legitimate demands of the recipients to terminate their relationship with the sender to not receive any more transmissions from them.
16. Frequently Changing Domain Name Records to Bias Reputation: A reputation score of a sender having a corresponding IP address/Domain name mapping that changes frequently can be biased to toward being non-reputable. Botnets—a collection of software robots, or bots, that run autonomously and automatically on a collection of compromised computers (e.g., Zombie computers). Botnets often associated with registered domain names and direct thousands of infected machines to serve as web servers or DNS servers for a domain name. The botnet can frequently change the DNS address record for a domain name, e.g., change the DNS address every few seconds, directing the traffic to another infected machine. In some implementations DNS servers can be continuously queried to identify domain names address records that change frequently and IP addresses that correspond to the identified frequently changing domain name address records. The reputation server can reduce the reputation of devices corresponding to the IP addresses associated with the identified domain names based upon determining that the IP address is associated with the frequently changing IP address/domain name mapping, thereby biasing the reputation of the device towards being non-reputable.

As used herein, biasing the reputation towards non-reputable or reputable results in a continuous spectrum of reputable and non-reputable classifications. The bias can be a linear function or a non-linear function, depending on the signal(s) from which the biasing is determined. Additional signals on which to bias a reputation score and biasing techniques are described below.

The following is a list of "reputable" criteria that could be used in determining the "reputability" of a sender. The list is not intended to be exhaustive, and can be adapted to include other criteria or remove criteria based upon observed behavior.

1. Mean Spam Score: A sender is declared "reputable" if the mean spam profiler score of transmissions that it sends falls below some threshold, W.
2. Human Feedback: A sender is declared "reputable" if it is reported to have sent only legitimate transmissions by people analyzing transmission flows from that sender, in conjunction with the reputation of the organization that owns those sending stations.
3. Using Bounce Address Tag Verification (BATV) to Bias Reputation: A sender having message that includes a BATV token associated with a message originator can have a reputation score that is biased toward reputable. The BATV token can be used to identify legitimate messages that have been bounced from a receiving server (e.g., based upon being unable to resolve the e-mail address). If a bounced message includes a BATV token appended to the original message by the mail server associated with the message originator, then the message is identified as authentic and the mail server notifies the user that the message was bounced. However, if the message was spoofed, the bounced message will not include the BATV token, and the mail server can discard the message or notify an administrator. In some implementations, the presence of the BATV token in a bounced message can be used to increase the reputability of the IP address associated with the originator of the message.

In some implementations, when a first party sends a message to a second party, the mail server can rewrite the from address as, e.g., <first-party>-<token>@example.com. When the second party responds to the message, the second party will respond to the address <first-party>-<token>@example.com. The mail server associated with the first party can resolve the address to <first-party>@example.com. The mail server can authenticate the message based upon the token information in the username. In further implementations, the mail server associated with the first party can match the "from" field of the message from the second party to the token included in the message to authenticate the message. Moreover, the reputation associated with the IP address of the second party can be biased toward being reputable based upon the presence of the token in the message to the first party.

The following is a list of biasing criteria that can be used in biasing a reputation score toward being "reputable" or "non-reputable". The biasing is dependent on the characteristics of the entity and/or message. The list is not intended to be exhaustive, and can be adapted to include other criteria or remove criteria based upon observed behavior.

1. Zone File Characteristics: In some implementations, domain registration data can be examined to identify zone files for all registered domains. The zone files can be analyzed to identify malicious domains. In some implementations, textual analysis of the domain name itself can be used to identify the randomness of the domain name based upon, for example, using n-gram language models or Markov-chain analysis to determine the randomness of a registered domain name. In this example, the more random a domain name appears to be based upon a language model, the more likely the domain name is not reputable. Thus, the randomness of a domain name can be used to reduce the reputation associated with the domain name or IP address(es) associated with the domain name. In further implementations, the non-randomness of a domain name can be used to increase the reputation associated with a domain name.

In further implementations, frequent name server changes can be used to adjust the reputation of a device or domain. For example, legitimate domains are more likely to have name server records that are relatively constant without change. However, non-reputable domains are more likely to change providers more frequently, and thereby are more likely to have multiple changes in the name servers that map the domain. Thus, if the zone file for a domain has many name server changes frequently over a period of time, it is more likely that the entity associated with the domain name is malicious. In such implementations, the reputation of the domain name can be biased to account for the increased likelihood that the domain name is associated with a malicious entity.

It has also been observed that domain names that have been registered for a longer period of time are more likely to be legitimate servers. However, domain names that have been registered recently have a higher likelihood of be non-reputable. Thus, in some implementations, the reputation associated with a domain name can be biased based upon the age of the domain name. The bias can be a linearly increasing function of time, an exponentially increasing function of time, or a logarithmically increasing function of time.
2. Traffic Pattern Characteristics: In some implementations, the reputation server can analyze the mail sending patterns of IP addresses. For example, reputable mail servers typically originate regular volumes of mail during the week, and low volumes of mail on the weekends, while non-reputable mail servers typically generate a more random mail origination pattern with a burst of traffic, followed by a period of very low volume of traffic. Thus, addresses or entities that do not have a regular mail sending pattern typically associated with a reputable mail server can be biased toward non-reputable. Moreover, addresses or entities that have a regular mail sending pattern associated with the sending patterns of reputable mail servers can be biased towards reputable.
3. Real Time Zombie Detector: In some implementations, the reputation system can flag IP addresses that have been persistent senders of messages. The reputation server can use these special flags to indicate that an IP address is not subject to analysis by the real-time tests, while IP addresses that have not been previously flagged can be analyzed using real-time tests. In some implementations, the reputation system can analyze information identifying how many devices asked for this IP address during a period of time (e.g., a ten minute window) and how often those devices asked for the IP address during that period of time. This information can be used to assign a breadth rating to the IP address. The breadth rating can be compared to breadth rating profiles of reputable and non-reputable IP addresses to determine how to bias the reputation of the address or device. For example, an IP address assigned a breadth rating which is similar to non-reputable IP addresses can be biased towards non-reputable, while an IP address assigned a breadth rating which is similar to reputable IP addresses can be biased towards reputable.

4. Persistent Communication Characteristics: In some implementations, the communication patterns of an entity with an established working set of recipients can be analyzed to identify a likelihood that the sender is reputable or non-reputable. A reputable sender might exchange e-mail with a certain set of recipients on a regular basis, while a non-reputable sender is more likely not to have any particular set of users with whom the non-reputable sender exchanges e-mail on a regular basis. For example, a spammer is more likely to send a single communication to thousands of recipients, while a legitimate user is more likely to send multiple communications to an established group of friends, coworkers, or clients. Thus, senders with an established set of recipients and/or sending patterns can be biased towards reputable (e.g., increasing the likelihood that the sender is identified as reputable), while senders without any established set of recipients and/or sending patterns can be biased toward non-reputable (e.g., increasing the likelihood that the sender is identified as non-reputable).

5. Subject Classification: In some implementations, information on subject fields and originating IP addresses can be collected from communications. The collected information can be aggregated, and a classification algorithm can be executed using the terms in the subject. Based upon data collected from a training data set, terms can be identified as associated with malicious messages (or associated with reputable messages). In some implementations, when a term appears with a given frequency in known non-reputable messages, the term can be identified as associated with non-reputable communications. For example, the term "Free financial offer", if it occurs with a statistically significant frequency in the subject line of messages, may be highly correlated with spam messages. The reputation of devices or addresses associated with communications that include subject field terms that are highly correlated with spam messages can be biased towards being non-reputable. Similarly, some terms can be identified as correlated with reputable messages if they appear within known reputable messages with a threshold frequency. Such terms can be used to bias the reputation of an associated device or address towards being identified as a reputable device or address.

In some implementations, all terms associated with subject fields of messages originating from an IP address can be concatenated and compared to the subject field profiles of known reputable and known non-reputable IP addresses. Devices or addresses that display a correlation to subject field profiles of known reputable IP addresses can be biased towards being classified as reputable, while devices or addresses that display a correlation to subject field profiles of known non-reputable IP addresses can be biased towards being classified as non-reputable.

6. Hash Vault Profiling: In some implementations, messages can be analyzed to extract hash values from messages using a winnowing algorithm. The winnowing algorithm is applied such that similar messages are most likely to produce similar or identical hash values. The winnowing algorithm can extract many fingerprints from a message and selects a number of fingerprints from different parts of the message, such that the selected fingerprints are most likely to be the same for messages that are similar.

In some implementations, the hashes can be stored along with the IP address to a hash vault. The hash vault can store millions of hashes and can be organized based upon a least recently used (LRU) algorithm, such that the least recently used hash can be removed when a new hash is encountered. The stored hashes in the hash vault can be flagged as reputable or non-reputable. In some implementations, the flag can include information on how many times the hash has been encountered. Hashes that have been encountered more than a threshold number of times can be identified as being associated with spam messages. If an entity sends messages that include non-reputable hashes, the reputation of the entity can be biased towards having a non-reputable reputation based upon the origination of non-reputable messages from the entity.

7. Performance Optimized Image Spam Correlation: Image spam can be difficult to identify. Simple techniques (i.e., techniques that do not require significant processing resources) are prone to false negatives, while more sophisticated techniques (i.e., techniques that require significant processing resources and are more accurate) can result is system performance degradation. In some implementations, a two tiered approach can be used to identify image spam. In the first step, a small set of key attributes can be identified from an image in a message. Based upon these attributes, a support vector machine can be used on the attributes as a first pass to determine which images are more likely to be spam. If the image is cleared by the first pass, it can be forwarded to the recipient. Otherwise the image is identified as potential spam and can be analyzed in more detail. Example key features can be extracted from the image header, including image size, image width, image height, number of bytes, how much the image can be compressed, etc.

In the more detailed analysis, additional features are identified from the image, including for example, noise levels, gradients, and number of edges, among many others. These more detailed features can be compared to the detailed features of known image spam, for example, using SVM algorithms. Detailed image spam analysis is described in U.S. patent application Ser. No. 11/626,568, entitled "Detecting Image Spam," filed on Jan. 24, 2007, which is hereby incorporated by reference in its entirety. An SVM classification algorithm is described in U.S. patent application Ser. No. 12/020,253, entitled "Granular Support Vector Machine with Random Granulation," filed on Jan. 25, 2008, which is hereby incorporated by reference in its entirety. The reputation of entities associated with image spam can be decreased or biased towards having a non-reputable reputation, while the reputation of entities associated with non-spam images can be increased or biased towards having a reputable reputation.

8. Reputation Intelligence Combined with From Domains to ID Spam: Spammers often try to spoof legitimate senders. In some implementations, the owner of IP addresses that send communications on behalf of domains can be identified. If the owner of the IP address and the domain differ, it is likely that the IP address is a non-reputable entity. For example, assume "example-mail.com" is a reputable mail site owned by Example Company, an established and reputable company. If an IP address that sends mail from examplemail.com does not belong to Example Company, owner of the example-mail.com domain, that IP address can be identified as a non-reputable entity. Additionally, the reputability score associated with IP addresses originating communications that do not match the domain identified by the communication can be reduced or biased towards being non-reputable. Similarly, the reputability score associated with IP addresses originating primarily communications that match the domain identified by the communication can be increased or biased towards being reputable.

The example list of biasing criteria is not limiting. Other biasing criteria can include reverse domain name server lookup failure; membership on one or more real-time blacklists (RBLs); mail volume; mail burstiness; mail breadth; geographic location; malware activity; classless inter-domain routing (CIDR) block comprising a number of internet protocol addresses identified to send spam; rate of honeypot detections; rate of undeliverable transmissions; continuity of operation; responsiveness to recipient requests; and the like.

Figure 7:
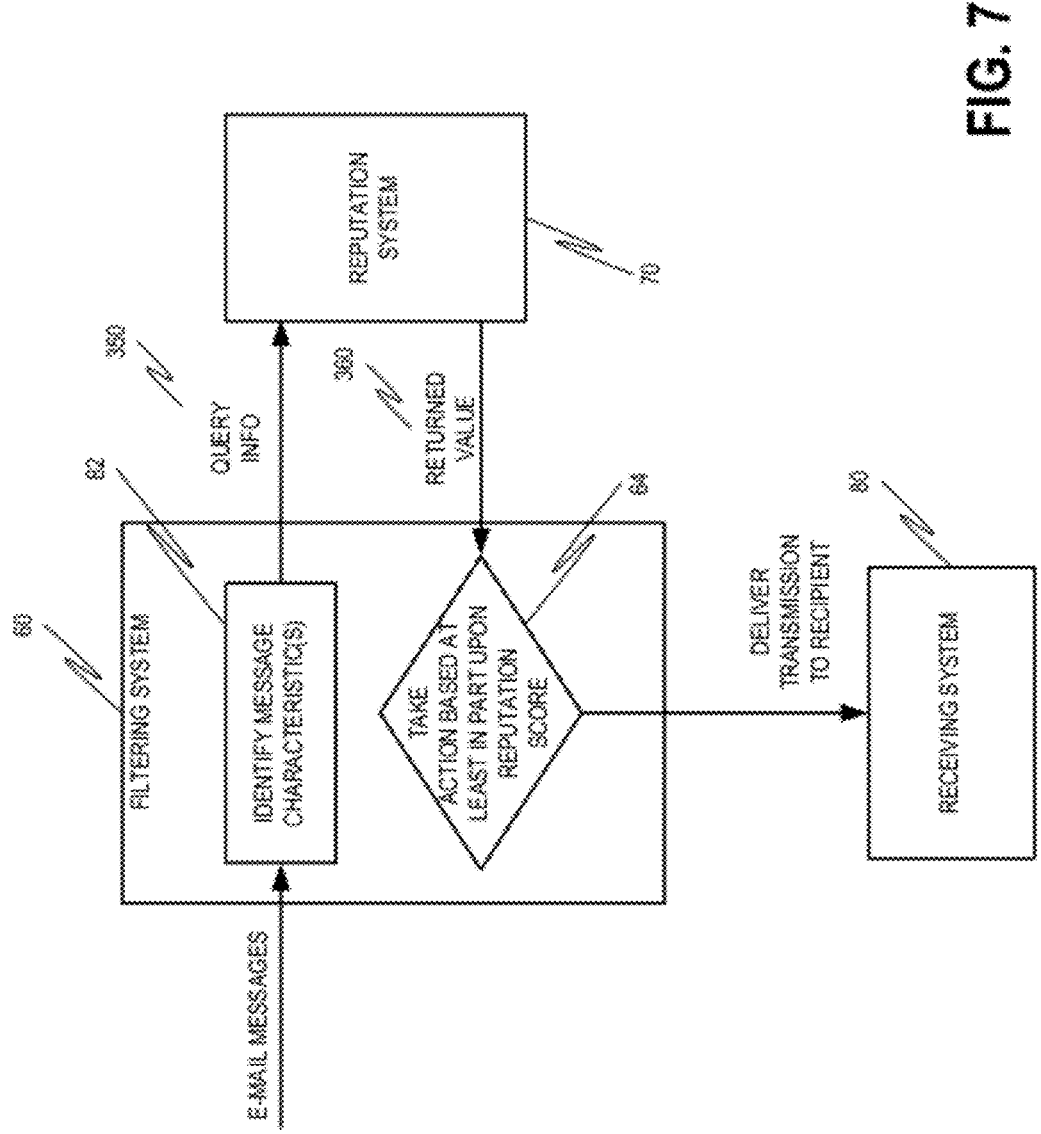
FIG. 7 is a block diagram depicting a reputation system configured to respond with a return value that includes the reputation score of a sender.

After computing a reputation grade for each sender in the universe of senders, a reputation classification can be made available via a communication protocol that can be interpreted by the queriers that make use of the reputation system (e.g., DNS, HTTP, etc). As shown in FIG. 7, when a query 350 is issued for a sender, the reputation system can respond with a return value 360 that includes the reputation score of that sender, as well as any other relevant additional information that can be used by the querier to make the final judgment on the acceptability of the sender's transmission (e.g., age of the reputation score, input data that determined the score, etc).

An example of a communication protocol that can be used is a domain name system (DNS) server which can respond with a return value in the form of an IP address: 172.x.y.z. The IP address can be encoded using the formula:

$$IP = 172 \cdot \left(\frac{rep - |rep|}{2 \times rep}\right) \cdot (|rep| div 256) \cdot (|rep| \mod 256)$$

The reputation of the queried sender can be deciphered from the return value as follows:

$$rep = (-1)^{2-x} \times (256y + z)$$

Therefore, when x=0, the returned reputation is a positive number, and when x=1, the returned reputation is a negative number. The absolute value of the reputation is determined by the values of y and z. This encoding scheme enables the server to return via the DNS protocol reputation values within the range [−65535, 65535]. It also leaves seven (7) unused bits, namely the seven high-order bits of x. These bits can be reserved for extensions to the reputation system. (For example, the age of a reputation score may be communicated back to the querier.)

Figure 8:
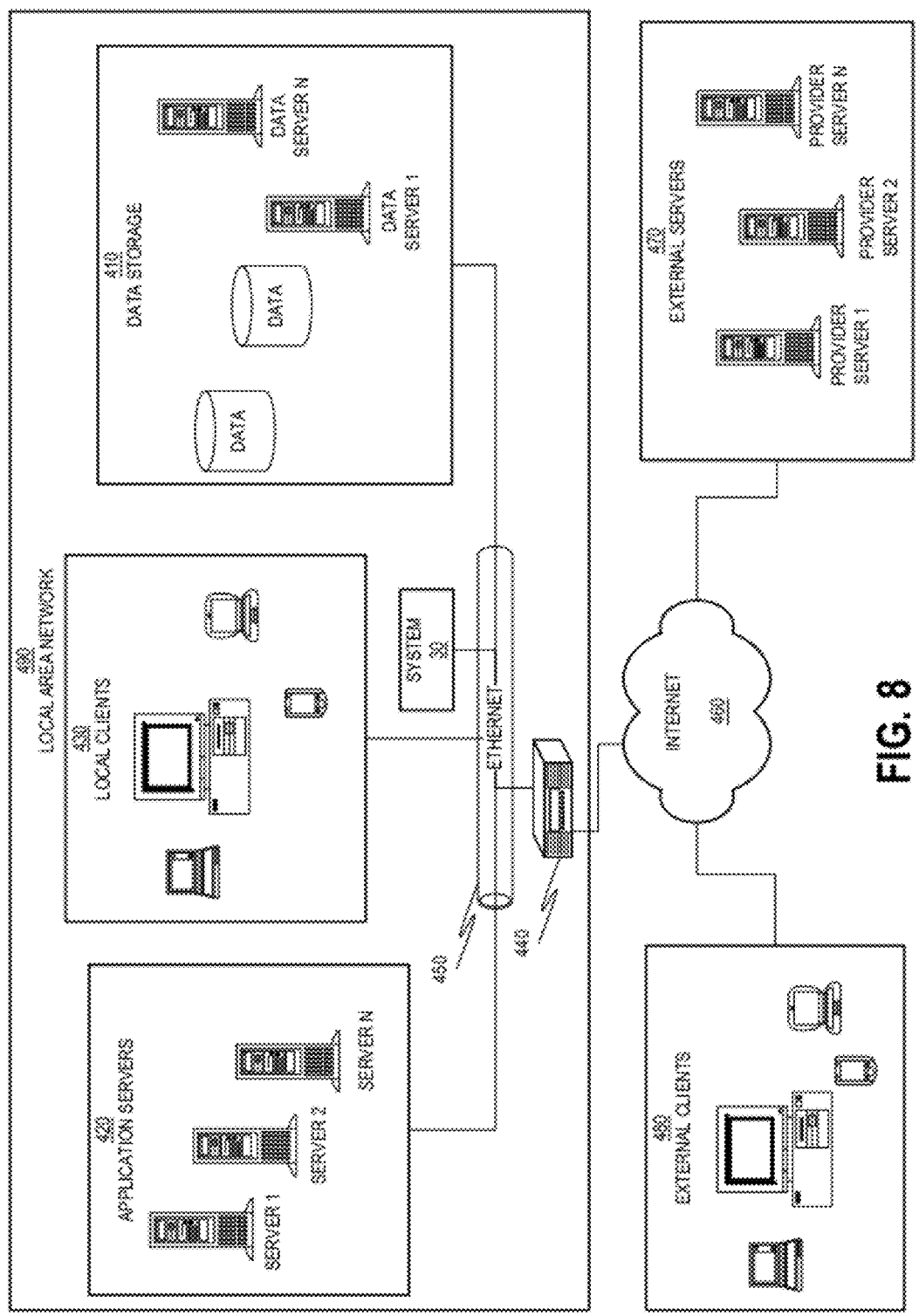
FIG. 8 is a block diagram depicting a server access architecture.

The systems and methods disclosed herein may be implemented on various types of computer architectures, such as for example on different types of networked environments. As an illustration, FIG. 8 depicts a server access architecture within which the disclosed systems and methods may be used (e.g., as shown at 30 in FIG. 8). The architecture in this example includes a corporation's local network 490 and a variety of computer systems residing within the local network 490. These systems can include application servers 420 such as Web servers and e-mail servers, user workstations running local clients 430 such as e-mail readers and Web browsers, and data storage devices 410 such as databases and network connected disks. These systems communicate with each other via a local communication network such as Ethernet 450. Firewall system 440 resides between the local communication network and Internet 460. Connected to the Internet 460 are a host of external servers 470 and external clients 480.

Local clients 430 can access application servers 420 and shared data storage 410 via the local communication network. External clients 480 can access external application servers 470 via the Internet 460. In instances where a local server 420 or a local client 430 requires access to an external server 470 or where an external client 480 or an external server 470 requires access to a local server 420, electronic communications in the appropriate protocol for a given application server flow through "always open" ports of firewall system 440.

A system 30 as disclosed herein may be located in a hardware device or on one or more servers connected to the local communication network such as Ethernet 480 and logically interposed between the firewall system 440 and the local servers 420 and clients 430. Application-related electronic communications attempting to enter or leave the local communications network through the firewall system 440 are routed to the system 30.

In the example of FIG. 8, system 30 could be configured to store and process reputation data about many millions of senders as part of a threat management system. This would allow the threat management system to make better informed decisions about allowing or blocking electronic mail (e-mail).

System 30 could be used to handle many different types of e-mail and its variety of protocols that are used for e-mail transmission, delivery and processing including SMTP and POP3. These protocols refer, respectively, to standards for communicating e-mail messages between servers and for server-client communication related to e-mail messages. These protocols are defined respectively in particular RFC's (Request for Comments) promulgated by the IETF (Internet Engineering Task Force). The SMTP protocol is defined in RFC 821, and the POP3 protocol is defined in RFC 1939.

Since the inception of these standards, various needs have evolved in the field of e-mail leading to the development of further standards including enhancements or additional protocols. For instance, various enhancements have evolved to the SMTP standards leading to the evolution of extended SMTP. Examples of extensions may be seen in (1) RFC 1869 that defines a framework for extending the SMTP service by defining a means whereby a server SMTP can inform a client SMTP as to the service extensions it supports and in (2) RFC 1891 that defines an extension to the SMTP service, which allows an SMTP client to specify (a) that delivery status notifications (DSNs) should be generated under certain conditions, (b) whether such notifications should return the contents of the message, and (c) additional information, to be returned with a DSN, that allows the sender to identify both the recipient(s) for which the DSN was issued, and the transaction in which the original message was sent. In addition, the IMAP protocol has evolved as an alternative to POP3 that supports more advanced interactions between e-mail servers and clients. This protocol is described in RFC 2060.

Other communication mechanisms are also widely used over networks. These communication mechanisms include, but are not limited to, Voice Over IP (VoIP) and Instant Messaging. VoIP is used in IP telephony to provide a set of facilities for managing the delivery of voice information using the Internet Protocol (IP). Instant Messaging is a type of communication involving a client which hooks up to an instant messaging service that delivers communications (e.g., conversations) in realtime.

As the Internet has become more widely used, it has also created new troubles for users. In particular, the amount of spam received by individual users has increased dramatically in the recent past. Spam, as used in this specification, refers to any communication receipt of which is either unsolicited or not desired by its recipient. A system and method can be configured as disclosed herein to address these types of unsolicited or undesired communications. This can be helpful in that e-mail spamming consumes corporate resources and impacts productivity.

The systems and methods disclosed herein are presented only by way of example and are not meant to limit the scope of the invention. Other variations of the systems and methods described above will be apparent to those skilled in the art and as such are considered to be within the scope of the invention. For example, using the systems and methods of sender classification described herein, a reputation system can be configured for use in training and tuning of external filtering techniques. Such techniques may include Bayesian, Support Vector Machine (SVM) and other statistical content filtering techniques, as well as signature-based techniques such as distributed bulk message identification and message clustering-type techniques. The training strategies for such techniques can require sets of classified legitimate and unwanted transmissions, which can be provided to the trainer by classifying streams of transmissions based on the reputation scores of their senders. Transmissions from senders classified as un-reputable can be provided to the filtering system trainer as unwanted, and the wanted transmissions can be taken from the stream sent by the legitimate senders.

As an illustration, methods and systems can be configured to perform tuning and training of filtering systems utilizing reputation scores of senders of transmissions in sets of trainable transmissions. At least one characteristic is identified about transmissions from senders. The identifying of at least one characteristic can include extracting unique identifying information about the transmissions (e.g., information about the senders of the transmissions), or authenticating unique identifying information about the transmissions, or combinations thereof. Queries are sent to a reputation system and scores are received representing reputations of the senders. Transmissions are classified into multiple categories based on a range a sender's reputation score falls into. Transmissions and their classification categories are passed on to a trainer of another filtering system to be used for optimization of the filtering system.

As another example, methods and systems can be configured to perform filtering of groups of transmissions utilizing reputation scores of senders of transmissions. Multiple transmissions can be grouped together based on content similarities or similarities in transmission sender behavior. At least one characteristic can be identified about each transmission in the groupings. The identifying of at least one characteristic can include extracting unique identifying information about the transmission (e.g., information about the sender of a transmission), or authenticating unique identifying information about the transmission, or combinations thereof. A query can be sent to the reputation system and receive a score representing reputation of each sender. Groups of transmissions can be classified based on the percentage of reputable and non-reputable senders in the group.

As another example of the wide variations of the disclosed systems and methods, different techniques can be used for computation of joint conditional probabilities. More specifically, different mathematical techniques can be used for computing the aggregate non-reputable sender probability, $P_{NR}$, and the aggregate reputable sender probability, $P_R$, for each sender in the reputation space. As an illustration, two techniques are described. Both techniques use $P(NR|C_i)$ and $P(R|C_i)$, the conditional probabilities of non-reputable and reputable behavior, for each testing criterion $C_i$. The first technique makes the assumption that all testing criteria are independent. The second technique incorporates the assumption that the testing criteria are not independent. Therefore, the second technique is more difficult to carry out, but produces more accurate results.

1. Technique for Independent Testing Criteria

In the independent case, it is assumed that each criterion $C_i$ is independent of all other criteria. The probability that the sender is non-reputable, $P_{NR}$, is calculated using the following formula:

$$P_{NR} = \frac{\prod P(NR|C_j)}{\prod P(NR|C_j) + \prod (1 - P(NR|C_j))}$$

where j ranges over all criteria that apply to the sender in question. Similarly, the probability that the sender is a reputable sender, $P_R$, is calculated using the following formula:

$$P_R = \frac{\prod P(R|C_j)}{\prod P(R|C_j) + \prod (1 - P(R|C_j))}$$

where j ranges over all criteria that apply to the sender in question.

2. Technique for Non-Independent Testing Criteria

In the dependent case, it is assumed that each criterion $C_i$ is not independent of all other criteria, so the analysis must take into account "non-linear" interactions between criteria within their joint probability distribution. To find the correct values for $P_{NR}$ and $P_R$ for a given sender, a table is constructed to represent the entire joint probability distribution. Below is a sample table for a joint distribution of four qualities/criteria.

| Case | $C_1$ | $C_2$ | $C_3$ | $C_4$ | $P_{NR}$ | $P_R$ |
|---|---|---|---|---|---|---|
| 1 | N | N | N | N | N/A | N/A |
| 2 | N | N | N | Y | $P(NR|C_4)$ | $P(R|C_4)$ |
| 3 | N | N | Y | N | $P(NR|C_3)$ | $P(R|C_3)$ |
| 4 | N | N | Y | Y | $P(NR|C_3, C_4)$ | $P(R|C_3, C_4)$ |
| 5 | N | Y | N | N | $P(NR|C_2)$ | $P(R|C_2)$ |
| 6 | N | Y | N | Y | $P(NR|C_2, C_4)$ | $P(R|C_2, C_4)$ |
| 7 | N | Y | Y | N | $P(NR|C_2, C_3)$ | $P(R|C_2, C_3)$ |
| 8 | N | Y | Y | Y | $P(NR|C_2, C_3, C_4)$ | $P(R|C_2, C_3, C_4)$ |
| 9 | Y | N | N | N | $P(NR|C_1)$ | $P(R|C_1)$ |
| 10 | Y | N | N | Y | $P(NR|C_1, C_4)$ | $P(R|C_1, C_4)$ |
| 11 | Y | N | Y | N | $P(NR|C_1, C_3)$ | $P(R|C_1, C_3)$ |

-continued

| Case | $C_1$ | $C_2$ | $C_3$ | $C_4$ | $P_{NR}$ | $P_R$ |
|---|---|---|---|---|---|---|
| 12 | Y | N | Y | Y | $P(NR|C_1, C_3, C_4)$ | $P(R|C_1, C_3, C_4)$ |
| 13 | Y | Y | N | N | $P(NR|C_1, C_2)$ | $P(R|C_1, C_2)$ |
| 14 | Y | Y | N | Y | $P(NR|C_1, C_2, C_4)$ | $P(R|C_1, C_2, C_4)$ |
| 15 | Y | Y | Y | N | $P(NR|C_1, C_2, C_3)$ | $P(R|C_1, C_2, C_3)$ |
| 16 | Y | Y | Y | Y | $P(NR|C_1, C_2, C_3, C_4)$ | $P(R|C_1, C_2, C_3, C_4)$ |

For a joint distribution of M criteria, there exist ($2^M-1$) distinct cases within the joint probability distribution. Each case constitutes a particular combination of characteristics. The probability that the sender is non-reputable, $P_{NR}$, is estimated for each case using the following technique. For each one of the ($2^M-1$) cases, a random sample of N senders is gathered that exhibit the combination of characteristics described by that case. (For this purposes, N=30 is a large enough sample). Each sender is sorted into one of the following sets: reputable (R), non-reputable (NR) or unknown (U). $N_R$ is the number of sender in the sample that are reputable senders, $N_{NR}$ is the number of senders that are non-reputable senders, etc. Then, $P_{NR}$ and $P_R$ is estimated using the formulas:

$$P_{NR} = \frac{N_{NR}}{N}$$

$$P_R = \frac{N_R}{N}$$

The sampling of the IP addresses is repeated periodically (e.g., daily, weekly, monthly) to update the joint probability distribution.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer readable medium, such as a machine-readable storage device, a machine-readable storage substrate, a memory device, or a combination of one or more of them.

The terms "computer" or "server" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or one that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method to assign a reputation to a messaging entity, comprising:
   receiving a query comprising data that identifies a plurality of biasing characteristics related to a messaging entity associated with the communication;
   analyzing, using at least one processor device, the identified plurality of biasing characteristics related to the messaging entity associated with the communication based upon a plurality of criteria;
   determining a reputation score associated with the messaging entity based upon the analysis of the identified plurality of biasing characteristics related to the messaging entity associated with the communication;
   encoding the reputation score based at least in part on a communication protocol, wherein the reputation score is encoded in at least a portion of an IP address; and
   transmitting the encoded reputation score as a response to the query.

2. The method of claim 1, further comprising distributing the reputation score to one or more computer systems for use in filtering communications.

3. The method of claim 1, wherein the reputation scores is indicative numeric, textual or categorical reputations that are assigned to messaging entities based on characteristics of the messaging entities and their behavior, and wherein the numeric reputations comprise a continuous spectrum of reputable and non-reputable classifications.

4. The method of claim 1, further comprising:
   determining reputation indicative probabilities based upon characteristics of the messaging entity; and
   aggregating the reputation indicative probabilities to identify the reputation score;
   wherein a reputation indicative probability indicates reputability of a messaging entity based upon extent to which a characteristic of the entity correlates to one or more reputation-related criteria.

5. The method of claim 1 further comprising:
   identifying a set of criteria for use in discriminating between reputable and non-reputable classifications, wherein the criteria include non-reputable criteria and reputable criteria;
   using statistical sampling to estimate a conditional probability that a messaging entity includes each criteria;
   computing a reputation for each messaging entity, comprising:
      calculating a reputable probability that a messaging entity has a reputable reputation by computing an estimate of joint conditional probability that the messaging entity is reputable, given the set of reputable criteria to which the messaging entity correlates;
      calculating a non-reputable probability that the messaging entity have a negative reputation by computing an estimate of joint conditional probability that the messaging entity is non-reputable, given the set of non-reputable criteria to which the messaging entity correlates; and
      combining the reputable probability and the non-reputable probability to determine a combined reputation for a messaging entity.

6. The method of claim 5, wherein determining a reputation score associated with the messaging entity based upon the analysis of the identified plurality of biasing characteristics comprises hash vault profiling messages from the messaging entity.

7. The method of claim 5, wherein determining a reputation score associated with the messaging entity based upon the analysis of the identified plurality of biasing characteristics comprises verifying a bounce address tag of a message from the messaging entity.

8. One or more non-transitory computer readable media for filtering communications stored on one or more computer systems, the one or more computer readable media being operable to cause one or more data processors associated with the one or more computer systems to perform operations comprising:
   receiving a query comprising data that identifies a plurality of biasing characteristics related to a messaging entity associated with the communication;
   analyzing the identified plurality of biasing characteristics related to the messaging entity associated with the communication based upon a plurality of criteria;
   determining a reputation score associated with the messaging entity based upon the analysis of the identified plurality of biasing characteristics related to the messaging entity associated with the communication;
   encoding the reputation score based at least in part on a communication protocol, wherein the reputation score is encoded in at least a portion of an IP address; and
   transmitting the encoded reputation score as a response to the query.

9. The computer readable media of claim 8, the computer readable media being further operable to cause the processor to perform an operation comprising distributing the reputation score to one or more computer systems for use in filtering communications.

10. The computer readable media of claim 8, wherein the reputation scores is indicative numeric, textual or categorical reputations that are assigned to messaging entities based on characteristics of the messaging entities and their behavior, and wherein the numeric reputations comprise a continuous spectrum of reputable and non-reputable classifications.

11. The computer readable media of claim 8, the computer readable media being further operable to cause the processor to perform operations comprising:
    determining reputation indicative probabilities based upon characteristics of the messaging entity; and
    aggregating the reputation indicative probabilities to identify the reputation score;
    wherein a reputation indicative probability indicates reputability of a messaging entity based upon extent to which a characteristic of the entity correlates to one or more reputation-related criteria.

12. The computer readable media of claim 8, the computer readable media being further operable to cause the processor to perform the operations comprising:
    identifying a set of criteria for use in discriminating between reputable and non-reputable classifications, wherein the criteria include non-reputable criteria and reputable criteria;
    using statistical sampling to estimate a conditional probability that a messaging entity includes each criteria;
    computing a reputation for each messaging entity, comprising:
        calculating a reputable probability that a messaging entity has a reputable reputation by computing an estimate of joint conditional probability that the messaging entity is reputable, given the set of reputable criteria to which the messaging entity correlates;
        calculating a non-reputable probability that the messaging entity have a negative reputation by computing an estimate of joint conditional probability that the messaging entity is non-reputable, given the set of non-reputable criteria to which the messaging entity correlates; and
        combining the reputable probability and the non-reputable probability to determine a combined reputation for a messaging entity.

13. The computer readable media of claim 8, wherein determining a reputation score associated with the messaging entity based upon the analysis of the identified plurality of biasing characteristics comprises hash vault profiling messages from the messaging entity.

14. The computer readable media of claim 8, wherein determining a reputation score associated with the messaging entity based upon the analysis of the identified plurality of biasing characteristics comprises verifying a bounce address tag of a message from the messaging entity.

15. A security system comprising:
    at least one communication interface communicatively coupling the security system to one or more server systems;
    a system data store capable of storing an electronic communication and accumulated data associated with received electronic communications; and
    a system processor in communication with the system data store and the at least one communication interface, wherein the system processor comprises one or more processing elements and wherein the system processor performs operations comprising:
        receiving a query comprising data that identifies a plurality of biasing characteristics related to a messaging entity associated with the communication;
        analyzing the identified plurality of biasing characteristics related to the messaging entity associated with the communication based upon a plurality of criteria;
        determining a reputation score associated with the messaging entity based upon the analysis of the identified plurality of biasing characteristics related to the messaging entity associated with the communication;
        encoding the reputation score based at least in part on a communication protocol, wherein the reputation score is encoded in at least a portion of an IP address; and
        transmitting the encoded reputation score as a response to the query.

16. The method of claim 1, wherein the communication protocol comprises domain name service (DNS).

17. The method of claim 1, wherein the IP address includes an extension to the reputations score.

18. The method of claim 17, wherein the extension identifies at least one of: an age of the reputation score, and input data used in determination of the score.

19. The method of claim 1, wherein the IP address comprises four bytes and is encoded such that a dotted-decimal value of a first one of the bytes identifies whether the reputation score is generally negative or generally positive, and the reputation score is capable of being derived at least in part from a dotted-decimal value of a second one of the bytes.

20. The method of claim 19, wherein the IP address is of a form IP=a.b.c.d, wherein each of a, b, c, and d comprise a respective dotted-decimal value, b comprises the first byte, c comprises the second byte, and the reputation score, rep, is to be encoded such that:

$b=((rep-|rep|)/(2*rep)$ $c=|rep|\ div\ 256$; and $d=|rep|\ mod\ 256$.

21. The method of claim 20, wherein the reputation score is derivable from the dotted-decimal values of c and d.

* * * * *